(12) United States Patent
Aminto et al.

(10) Patent No.: US 9,882,983 B2
(45) Date of Patent: *Jan. 30, 2018

(54) SYSTEM AND METHOD FOR OPTIMIZED CONTENT SYNCHRONIZATION FOR MOBILE DEVICES

(71) Applicant: AVAI Mobile Solutions, LLC, Austin, TX (US)

(72) Inventors: Jason Aminto, Austin, TX (US); J. Rand Arnold, Austin, TX (US)

(73) Assignee: AVAI Mobile Solutions, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,051

(22) Filed: Jun. 5, 2017

(65) Prior Publication Data

US 2017/0279887 A1 Sep. 28, 2017

Related U.S. Application Data

(63) Continuation-in-part of application No. 14/670,104, filed on Mar. 26, 2015, now Pat. No. 9,692,822.
(Continued)

(51) Int. Cl.
*G06F 15/16* (2006.01)
*H04L 29/08* (2006.01)
(Continued)

(52) U.S. Cl.
CPC .... *H04L 67/1095* (2013.01); *H04M 1/72522* (2013.01); *H04W 4/003* (2013.01)

(58) Field of Classification Search
CPC ... H04L 67/1095; H04L 51/06; H04L 65/601; H04L 12/5825; H04L 69/24; H04W 4/003; H04M 1/72522
(Continued)

(56) References Cited

U.S. PATENT DOCUMENTS 7,349,913 B2 * 3/2008 Clark ................ G06F 17/30174
8,166,101 B2 * 4/2012 Shah ................ G06F 17/30595
709/203
(Continued)

OTHER PUBLICATIONS

Office Action issued in U.S. Appl. No. 14/670,104, dated Nov. 9, 2016, 13 pages.

*Primary Examiner* — Michael Y Won
(74) *Attorney, Agent, or Firm* — Sprinkle IP Law Group

(57) ABSTRACT

A mobile device may download preconfigured synchronization settings from a server machine. An application running on the mobile device may have special control logic that works with the server machine to implement a mobile synchronization algorithm. The control logic may collect information on communication system elements including device attributes, static channel attributes, dynamic channel attributes, or a combination thereof. The server machine may determine communication settings based at least on the collected information. The mobile device may, based at least in part on the determined communication settings, perform a synchronization process and obtain one or more synchronization items from the server machine to update content, graphics, and/or behavior of the application. Upon completion of the synchronization process, statistics may be collected and used in a subsequent dynamic synchronization process. To further optimize synchronization performance while minimizing costs, a multi-tier storage solution may be utilized.

20 Claims, 15 Drawing Sheets

Related U.S. Application Data

(60) Provisional application No. 61/970,792, filed on Mar. 26, 2014.

(51) Int. Cl.
*H04W 4/00* (2009.01)
*H04M 1/725* (2006.01)

(58) Field of Classification Search
USPC ........ 709/228, 203, 211, 212, 213, 217, 248
See application file for complete search history.

(56) References Cited

U.S. PATENT DOCUMENTS

| | | |
|---|---|---|
| 8,468,214 B1 | 6/2013 | Bourlas et al. |
| 9,692,822 B1 | 6/2017 | Cheshire et al. |
| 2005/0278458 A1* | 12/2005 | Berger .............. G06F 17/30575 709/248 |
| 2015/0358406 A1 | 12/2015 | Scheer et al. |
| 2016/0085658 A1 | 3/2016 | Manion et al. |

* cited by examiner

FIG. 10

SYSTEM AND METHOD FOR OPTIMIZED CONTENT SYNCHRONIZATION FOR MOBILE DEVICES

CROSS-REFERENCE TO RELATED APPLICATIONS

This is a continuation-in-part application of, and claims a benefit of priority under 35 U.S.C. § 120 from U.S. patent application Ser. No. 14/670,104, filed Mar. 26, 2015, entitled "SYSTEM AND METHOD FOR OPTIMIZED CONTENT SYNCHRONIZATION FOR MOBILE DEVICES," which is a conversion of, and claims a benefit of priority under 35 U.S.C. § 119 from U.S. Provisional Application No. 61/970,792, filed Mar. 26, 2014, entitled "SYSTEM AND METHOD FOR OPTIMIZED CONTENT SYNCHRONIZATION FOR MOBILE DEVICES," all of which are hereby fully incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to content synchronization. More particularly, embodiments disclosed herein relate to optimized content synchronization for mobile devices.

BACKGROUND OF THE RELATED ART

Mobile devices provide a convenient way to obtain and review information and content via rich graphical interfaces, app behaviors, and functionality. Most content providers desire an efficient method to provide updated content, graphics and changes to app behaviors to these mobile devices. These elements can change frequently and can include content of varying size, some content being quite large.

An existing method of providing updated content to mobile devices is through online access to the content. While this approach may provide access to the latest content, it requires network connectivity to access the content and network connectivity may not always be available, depending upon time, place, and/or carrier network signal strength. In addition, if the desired content is sizable, it can take a great deal of time to download this content over costly connections. Consequently, there is room for innovations and improvements in providing and/or synchronizing content to mobile devices.

SUMMARY OF THE DISCLOSURE

Mobile technologies have many useful applications, largely based on the information that can be made available on mobile devices. Unfortunately, network connectivity is not always available to mobile devices. Furthermore, even if a user of a mobile device may have online access, the size of the content that the user wants to access may take too long and/or may be too expensive to download.

Embodiments disclosed herein can address these issues and more. An object of the invention is to support both offline access and access to large sized content so it can be quickly available. Another object of the invention is to allow a client of a mobile computing platform to update an application's appearance, content, and/or behavior(s) without having to go through a third-party electronic store or online market place (collectively referred to hereinafter as an "app store"). Yet another object of the invention is to provide content providers and, in some embodiments, their users, with a means to control how mobile content synchronization can be performed. Yet another object of the invention is to provide synchronization statistics that can be used for further optimization.

These objects may be realized in a method for mobile synchronization comprising obtaining characteristics of a mobile device, of a communication channel between the mobile device and a server, and of data to be synchronized. In some embodiments, such characteristics may be obtained in the form of attributes. The method may further comprise determining an optimal synchronization process based at least in part on the attributes and synchronizing the data from the server to the mobile device using the optimal synchronization process.

More specifically, a method for optimized content synchronization may include a mobile device downloading preconfigured synchronization settings from a server machine. The server machine may include at least one processor and non-transitory computer memory embodying a mobile synchronization algorithm. An application running on the mobile device may be a native mobile application configured with special control logic that can work in concert with the server machine to implement the mobile synchronization algorithm. The method may further include collecting, by the control logic within the application, information on communication system elements. Such information on communication system elements may include device attributes, static channel attributes, dynamic channel attributes, or a combination thereof. The collected information on the communication system elements may be sent to the server machine. The server machine may determine communication settings based at least on the collected information on the communication system elements received from the mobile device. The mobile device may download the determined communication settings from the server machine and, based at least in part on the determined communication settings, perform a synchronization process and obtain one or more synchronization items from the server machine. The synchronization process may be performed in a preconfigured manner or in a dynamic manner. In some embodiments, synchronization statistics may be collected upon completion of a synchronization process and used in a subsequent dynamic synchronization process. The one or more synchronization items may include at least one of content, graphics, or behavior of the application. Upon completion of the synchronization process, the application may be enhanced or changed in appearance and/or behavior. However, the version number of the application remains unchanged. In some embodiments, an application update process is provided through which an application update may be performed via a third-party app stored such that the version number of the application can be changed.

In some embodiments, synchronization performance can be further optimized while minimizing costs by using a tiered storage solution. The tiered storage solution may comprise various storage mechanisms operating at different tiers of speeds and storage capacities. For example, a first tier storage mechanism may comprise a content delivery system that is particularly configured for storing infrequently updated content for longer periods of time and for providing near instantaneous responses to synchronization clients. A second tier storage mechanism may comprise a memory-optimized storage system that is particularly configured for storing transient data that is more frequently accessed by synchronization clients requesting the latest changes. A third tier storage mechanism may comprise a persistent data store or database that is particularly configured for long term storage and access. In operation, a request from a synchronization client may first be directed to the first tier storage mechanism. If the request cannot be fulfilled by the first tier storage mechanism, it is directed to the second tier storage mechanism. If the data is not available at the second tier storage mechanism, then the third tier storage mechanism is queried. The first and second tier storage mechanisms can operate to update their stored data accordingly such that, so long as their caches have not expired, they can service subsequent requests that may have the same request parameters.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 10-15 depict diagrammatic representations of screenshots showing examples of various types of content synchronization settings that may be specified using the administrative user interface of FIG. 9 in accordance with content provider preferences;

DETAILED DESCRIPTION

Figure 1:
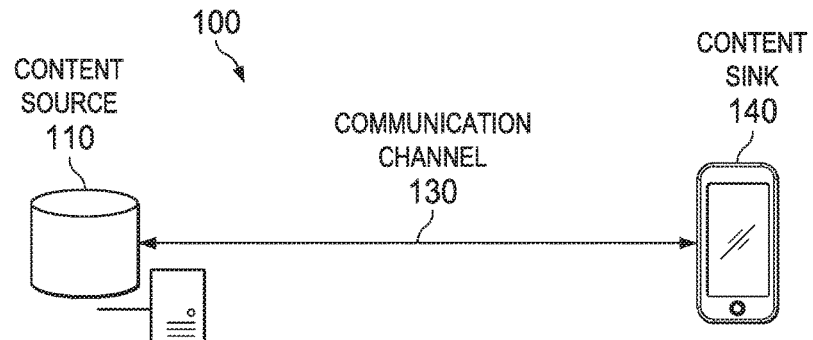
FIG. 1 depicts a diagrammatic representation of one example of a communication system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Mobile devices have a common need to access and obtain updated content. There are two approaches to access this content—dynamic online access and download and synchronization access. With the dynamic online access approach, a mobile device establishes a network connection with a content provider server machine and dynamically accesses content on every request for content by a user on the mobile device. With the download and synchronization access approach, a mobile device establishes a network connection with a content provider server machine and downloads and synchronizes content during a synchronization session. As this content is downloaded during the session, it is available for immediate subsequent use by the mobile device at a later time without needing to access the content over the network connection.

There are benefits and drawbacks to each of these approaches. The download and synchronization access approach can be beneficial when large amounts of content are involved, or when network connectivity is poor or non-existent. Specifically, when the content includes sizable items, it is often best to download and synchronize the content on a mobile device when the mobile device is able to establish a high-performance network connection with the content provider server machine. This content would then be locally accessible on the mobile device for later use when access to a high-performance network connection is no longer available. Attempt to access content using the dynamic online access approach may create a poor user experience as large content items may require the user to wait a long time before the content is available for review on the mobile device. Furthermore, accessing content using the dynamic online access approach may not always be possible or desirable as the network connection may not be available, usable (e.g., a poor network connection), or desirable (e.g., a high-cost network connection).

Embodiments disclosed herein can address issues related to the download and synchronization access approach, and include a unique algorithm for optimizing the process for content access from a mobile device. Before going into details of the embodiments, it may be helpful to discuss elements involved in the download and synchronization technology and challenges associated with providing an ideal user experience following the download and synchronization access approach. These challenges exist in several areas: communication system elements, content provider preferences, and mobile device user preferences.

As illustrated in FIG. 1, elements of a communication system (e.g., communication system 100) may include a content source (e.g., content provider server 110), a content sink (e.g., mobile device 140), and a communication channel (e.g., communication channel 130) connecting the content source and the content sink. Individual attributes of these elements can affect the ability to optimize a download and synchronization process.

For example, a content source can have widely varying attributes that can affect a download and synchronization process. Examples of content source attributes may include, but are not limited to, a total amount of content to be synchronized, sizes of individual content items, etc. Those skilled in the art will appreciate that, in this disclosure, a download and synchronization process may refer to a download process, a synchronization process, or both, depending upon what is needed by a content sink (e.g., an application running on a mobile device). In some cases, a synchronization process may employ a method where unique content items are synchronized individually. In such cases, the size of each individual content item will affect the performance of the synchronization process for that item.

Likewise, a communication channel can have widely varying attributes that can affect a download and synchronization process. Examples of communication channel attributes may include, but are not limited to, content source geographic location, content sink geographic location, velocity, carrier/provider, connection type (e.g., a WIFI network connection or a carrier cellular network connection), signal strength, latency, bandwidth, time of day (e.g., channel performance can be impacted by the time of day due to shared traffic demands on the channel), and so on. In this disclosure, "WIFI" refers to any type of network using radio frequency (RF) technology that implements the IEEE 802.11x standards, including 802.11a, 802.11b, 802.11g, 802.11n, 802.11ac, etc.

Furthermore, a content sink (e.g., mobile device 140) can have widely varying attributes that can affect a download and synchronization process. Examples of content sink attributes may include, but are not limited to, a mobile device's make/model, processing power, memory attributes (e.g., physical memory, virtual memory, etc.), operating system version, location services status, and so on.

As discussed above, a download and synchronization process can be affected by content provider preferences. These may include: selective content to download and synchronize, selective settings, and exposure of mobile device user preferences.

As to selective content, a content provider may elect to restrict (or permit) content that can be downloaded and synchronized based on a variety of factors relating to who is the specific user requesting the content, what content is requested, when the request is made, and where the mobile device is currently located. For instance, the content provider may elect to restrict (or permit) access to certain content items based on the specific user or user role attempting access to the content. The content provider may also elect to restrict (or permit) access to individual content items and/or prohibit certain individual content items to be downloaded and synchronized. This could be for various reasons. For example, a particular requested content item may be too large, or may not be ready for publication. Additionally, the content provider may elect to restrict (or permit) access to certain content items based on the time of day. Furthermore, the content provider may elect to restrict (or permit) access to certain content items based on the geographic location of the mobile device.

As to selective settings, a content provider may wish to define or control how a download and synchronization process should be performed and may set their preferences accordingly. This may include a preference in whether or how a download and synchronization process is to be modified.

As to exposure of mobile device user preferences, a content provider may elect to expose the ability for a mobile device user to manage synchronization preferences. If so, a download and synchronization process can be affected by mobile device user preferences as each mobile device user may have unique preferences for download of content items. Such mobile device user preferences may be considered to "override" content provider preferences. For example, a user might have purchased a lower cost data plan from a carrier that charges by the amount of content downloaded. While a content provider may desire to have all the content downloaded onto a mobile device when the mobile device is connected to the content provider server machine over the carrier network, the mobile device user may elect to override this behavior and only download the content when the mobile device is connected to the content provider server machine via a lower cost network (e.g. a WIFI network). Again, mobile device user preferences may only be available for user management if a content provider elects to expose the management of these settings to their mobile device users.

As exemplified above, challenges in various areas exist and can affect a content download and synchronization process, making it extremely difficult to provide an optimized process that can ensure the best user experience across various types of content sources, communication channels, and content sinks. In the context of this disclosure, "optimized" is used as a reference to the user experience. While it may be technically feasible to download and synchronize all content, it may not be optimal to a mobile device user if the mobile device user is not interested in downloading and synchronizing all content. Accordingly, embodiments disclosed herein provide an optimum algorithmic download and synchronization process that can focus on the configuration of the downloading and synchronization process based on content provider preferences and mobile device user preferences.

Figure 2:
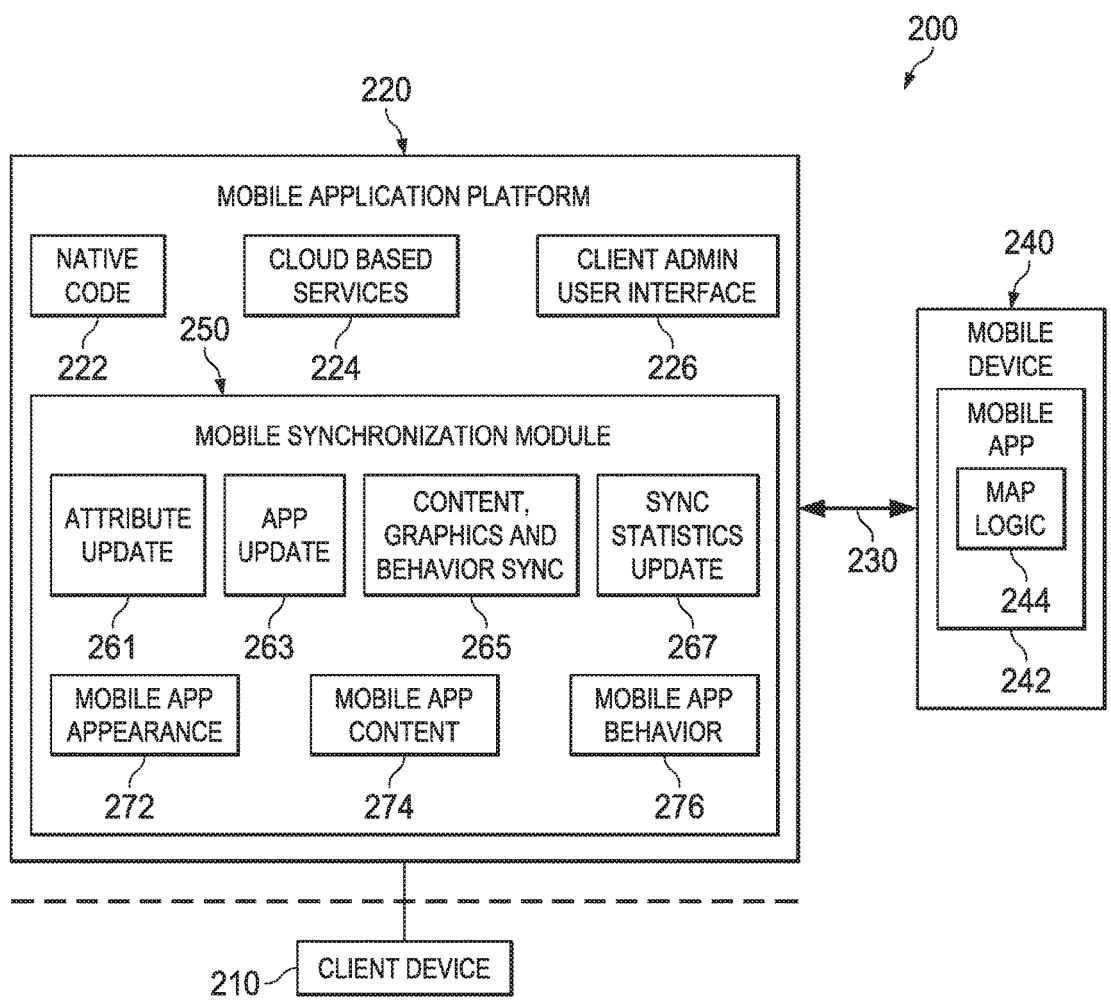
FIG. 2 depicts a diagrammatic representation of an example system for mobile synchronization according to some embodiments.

In some embodiments, the optimum algorithmic download and synchronization process may be implemented utilizing a system particularly configured for mobile synchronization, one example of which is illustrated in FIG. 2. In this example, system 200 may comprise mobile application platform 220 (hereinafter referred to as "MAP 220") communicatively connected to client device 210 and mobile device 240. Computer platform hardware and software known to those skilled in the art are not described herein so as not to unnecessarily obscure the invention in detail.

Furthermore, those skilled in the art will appreciate that client device 210 may represent multiple client devices and that mobile device 240 may represent multiple mobile devices. In some cases, client device 210 and MAP 220 may be owned and operated by different entities such as companies, businesses, corporations, enterprises, organizations, content providers, etc. In such cases, a user of client device 210 may represent an administrator or an authorized user of a customer (e.g., a content provider) of MAP 220. Either the customer or an operator of MAP 220 may own or provide mobile application 242 that a mobile device user downloaded onto mobile device 240.

Mobile application 242 may be a native mobile application and may include special MAP logic 242 that is particularly configured for communicating with MAP 220 and performing deterministic functions for the optimum algorithmic download and synchronization process disclosed herein. In some cases, client device 210 and MAP 220 may be owned and operated by the same entity. To this end, a user of client device 210 may represent an administrator or an authorized user of MAP 220 and a mobile device user of mobile device 240 may represent an end user of MAP 220. The operator of MAP 220 may own or provide mobile application 242 that the mobile device user downloaded onto mobile device 240 or mobile application 242 may be a third-party application running on mobile device 240. In all cases, mobile application 242 may include special MAP logic 242 that is particularly configured for communicating with MAP 220 and performing deterministic functions for the optimum algorithmic download and synchronization process disclosed herein.

In some embodiments, MAP 220 may comprise native code 222 running on one or more server machines. Native code 222 may be configured to coordinate how cloud based services 224 can be provided to client device 210 and/or mobile device 240. Client admin user interface 226 may be implemented on a service machine of MAP 220 and provided to client device 210 over a network connection. Alternatively, client admin user interface 226 may be implemented using cloud based services 224. Software as a service (SaaS) and cloud computing are known to those skilled in the art and thus are not further described herein. As an example, an authorized user such as an administrator may access client admin user interface 226 using thin client software via a web browser running on client device 210.

Through client admin user interface 226, an administrator or authorized user of client device 210 may indicate to mobile synchronization module 250 what, when, and how mobile application appearance 272, mobile application content 274, and mobile application behavior(s) 276 for mobile application 242 should be updated on or provided to mobile device 240.

Those skilled in the art will appreciate that embodiments disclosed herein may be particularly useful for certain types of mobile devices that include, but are not limited to, smartphones, tablets, handheld devices, or any mobile device having the capabilities (collectively referred to hereinafter as "smart devices") to connect to multiple types of wireless networks (e.g., a WIFI network, a cellular carrier network, etc.) as well as different types of network connections (e.g., 802.1ac, b, n, g WIFI network connections, 3G, 4G, LTE, edge cellular network connections, etc.).

While many of today's smart devices have advanced wireless network capabilities for connecting to a communication channel (which may include one or more infrastructure networks, one or more device-to-device (or Ad Hoc) networks, and/or a cellular network distributed over land areas called cells), they have little, if any, control over the communication channel itself. At best, a smart device may notify a user that downloading a large file or updating an application is not advised or possible with a cellular network connection, or the smart device may require connecting to a computer and/or a WIFI network in order to perform a required update. Even so, an application that has been downloaded and that runs on the smart device (i.e., at the content sink side) typically has no control over the communication channel or a download and synchronization process using the communication channel.

To this end, embodiments disclosed herein provide a technical solution that utilizes various attributes, including communication channel attributes, to optimize how a content sink (e.g., mobile device 240) can download and/or sync content from a content source (e.g., MAP 220 or a content server connected to MAP 220) via a communication channel (e.g., communication channel 230). That is, even though neither the content sink nor the content source may have control over the communication channel through which a download and synchronization process is performed, they can work in concert to improve the download and synchronization process, for instance, by implementing a mobile synchronization algorithm that, as explained below, utilizes these particular attributes, including communication channel attributes.

More specifically, in some embodiments, mobile synchronization module 250 may implement a sophisticated mobile synchronization algorithm to provide an optimized mobile device experience for downloading and synchronizing content, graphics, and/or behaviors relating to mobile application 242 to mobile device 240 from a content source (e.g., a content server, a data repository, etc.). In some embodiments, such a content source can be part of or external to MAP 220. In one embodiment, MAP 220 may comprise a content server. In one embodiment, MAP 220 and client device 210 may operate in the same enterprise computing environment or network. In one embodiment, MAP 220 and client device 210 may operate in two independent networks, as illustrated by the dotted line shown in FIG. 2. That is, MAP 220 may host the content or the content may be obtained from a content source external to MAP 220. If external, the content source may be on-site on a customer's premises or hosted in a cloud and MAP 220 may provide a content download and synchronization service to the content source (a customer of MAP 220). Accordingly, in one embodiment, client device 210 may comprise a content server. In one embodiment, a content server may be hosted in a cloud computing environment and communicatively connected to MAP 220 over a network.

In some embodiments, the mobile synchronization algorithm may employ the following elements:

Server Administered Settings—Server Administered Settings may allow an administrator to specify particular aspects and configuration settings of the download and synchronization.

Mobile Device Attributes—Mobile Device Attributes including the device type, operating system, application version, etc. may be examined to further optimize the download and synchronization process.

Network Connection Attributes—Network Connection Attributes including connection speed, latency, quality, etc. may be examined to further optimize the download and synchronization process.

In some embodiments, mobile synchronization module 250 may further include a plurality of functions or processes implementing the mobile synchronization algorithm. As illustrated in FIG. 2, the plurality of processes may include attribute update process 261, application update process 263, content, graphics and behavior synchronization process 265, and synchronization statistics update process 267.

In some embodiments, attribute update process 261 may be configured for gathering, collecting, or obtaining performance and attribute information about communication system elements such as information about communication channel 230. In some embodiments, application update process 263 may be configured for analyzing and determining whether a mobile application (e.g., mobile application 244 shown in FIG. 2) should be updated to a newer version. In some embodiments, content, graphics and behavior synchronization process 265 may be configured for analyzing and determining an optimal process to download and synchronize updated data (application appearance, content and/or behavior(s)) based on the mobile synchronization algorithm's elements described above. In some embodiments, synchronization statistics update process 267 may be configured for collecting and/or sending the performance statistics for a synchronization operation to a server for use in future sync operations.

Figure 3:
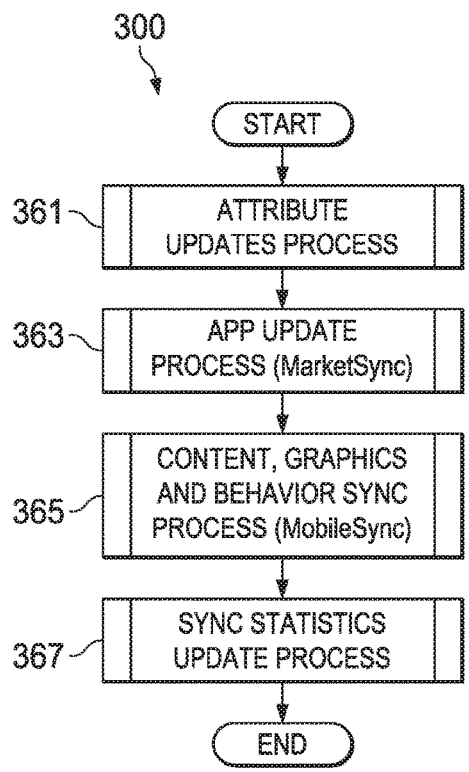
FIG. 3 is a process flow with a plurality of processes implementing a special mobile synchronization algorithm according to some embodiments.

Accordingly, as exemplified in FIG. 3, in some embodiments, mobile synchronization algorithm 300 may include performing an attribute update process (step 361), an application update process (step 363), a content, graphics and behavior synchronization process (step 365), and a synchronization statistics update process (step 367). These processes are further described below. Those skilled in the art will appreciate that FIG. 3 shows an example of mobile synchronization algorithm 300 implementing a particular set of processes (e.g., attribute update process 261, application update process 263, content, graphics and behavior synchronization process 265, and synchronization statistics update process 267 shown in FIG. 2) in a particular order (e.g., steps 361, 363, 365, and 367) according to one embodiment. However, other embodiments are also possible in that these processes are not required to perform in any particular order and that mobile synchronization algorithm 300 may implement one or more of these processes. Furthermore, mobile synchronization algorithm 300 may implement all or a subset of these processes in parallel, sequentially, or asynchronously.

Referring to FIGS. 2 and 3, in some embodiments, mobile synchronization module 250 may leverage mobile synchronization algorithm 300 to provide an optimized delivery of synchronization of elements. As an example, an optimized delivery of synchronization of elements may lead to a change or changes in the appearance, content, and/or behavior(s) of an application downloaded on a mobile device. According to this disclosure, many factors may be involved in determining what constitutes optimal. Example factors may include characteristics of the mobile device itself, a communication channel over which the mobile device communicates with a data source (e.g., a content server, a data repository, etc.), type(s) of content stored on the data source, performance of the user experience on the mobile device, etc.

Figure 4:
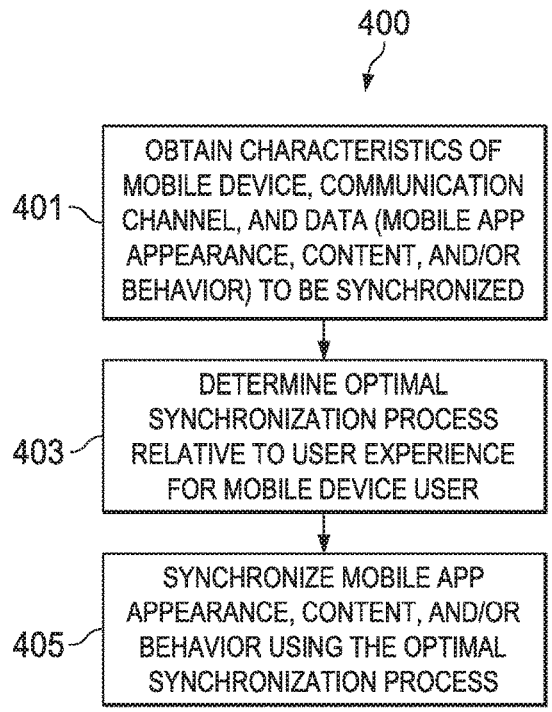
FIG. 4 is a flow chart illustrating a method for mobile synchronization according to some embodiments.

Thus, as illustrated in FIG. 4, one example embodiment of method 400 for mobile synchronization may comprise collecting or obtaining characteristics of a mobile device, characteristics of a communication channel between the mobile device and a server, and characteristics of data to be synchronized (step 401). In some embodiments, such characteristics may be obtained in the form of attributes in many ways. For example, in some embodiments, attributes of a mobile device (e.g., type of device) may be provided by the mobile device itself. In some embodiments, both the mobile device and the server may perform a test to obtain the attributes of the communication channel (e.g., available bandwidth, network speed, etc.). The server may have access and/or knowledge of the attributes of the data (e.g., content type) to be synchronized.

Method 400 may further comprise determining an optimal synchronization process (step 403). This may include analyzing the attributes obtained previously (e.g., from step 401) and, based at least in part on the attributes, determining the optimal mechanism to synchronize the data from the server to the mobile device. In some embodiments, the calculation may be done using an empirical or a statistical method. For example, the mobile synchronization algorithm may determine that synchronization of a piece of content of a certain type and exceeding a certain size is best performed at a particular time of day, week, and/or month, based on historical network connectivity data, the communication channel's bandwidth, the type of content, etc. In this way, synchronization may be performed differently for different sets of attributes.

In some embodiments, a table may store information as to what synchronization mechanism is to be used based on these characteristics. In some embodiments, an administrator of an application may specify, using an administrator interface (e.g., client admin user interface 226 shown in FIG. 2), how they want to do the synchronization, given the attributes obtained by the system.

Once a synchronization process is determined to be optimal relative to user experience for a mobile device user, method 400 may further comprise synchronizing the data (e.g., application enhancements relating to an application's appearance, content, and/or behavior) from the server to the mobile device using the optimal synchronization process (step 405). As explained below, a unique advantage provided by the mobile synchronization algorithm disclosed herein is that an application can be updated or otherwise enhanced without involving an app store where the application is made available to end users. The enhanced/updated application may move, act, and/or look like a completely different application, even though the application's version number, which is enforced by the app store, remains unchanged. There can be a range of enhancements/updates that can be performed in this way. For example, an application running on a mobile device may be updated to have a different navigation structure, add or delete a structural feature of the application, and/or change the functionality of a feature of the application, etc. Referring again to FIG. 2, this allows an administrator to log into MAP 220 via client admin user interface 226 and change user experience of mobile application 242 without having to go through an approval process that is typically required if the update is done through an app store.

As those skilled in the art will appreciate, a conventional way for a company or application developer to update their mobile application is to submit the mobile application to an app store and wait for the app store to approve the mobile application and make the application available for download from the app store. This process (which occurs at the backend of the app store and not at the consumer-facing frontend of the app store) can take weeks, even if the update is very minor.

Wth embodiments disclosed herein, an administrator can not only update content of an application downloaded on a mobile device, but can also change the attributes and feature set of the application itself, even though the application reside on a mobile device remote from the network environment in which the administrator operates. Once the administrator indicates that the change(s) should be synchronized to mobile devices where the application has been downloaded, the change(s) can be pushed out at a scheduled time or instantaneously, essentially performing a real time application update. This can advantageously eliminate the needs to conduct/manage application rebuilds through the traditional app stores.

Examples of an attribute update process, an application update process, a content, graphics and behavior synchronization process, and a synchronization statistics update process will now be described with reference to FIGS. 5-8.

Figure 5:
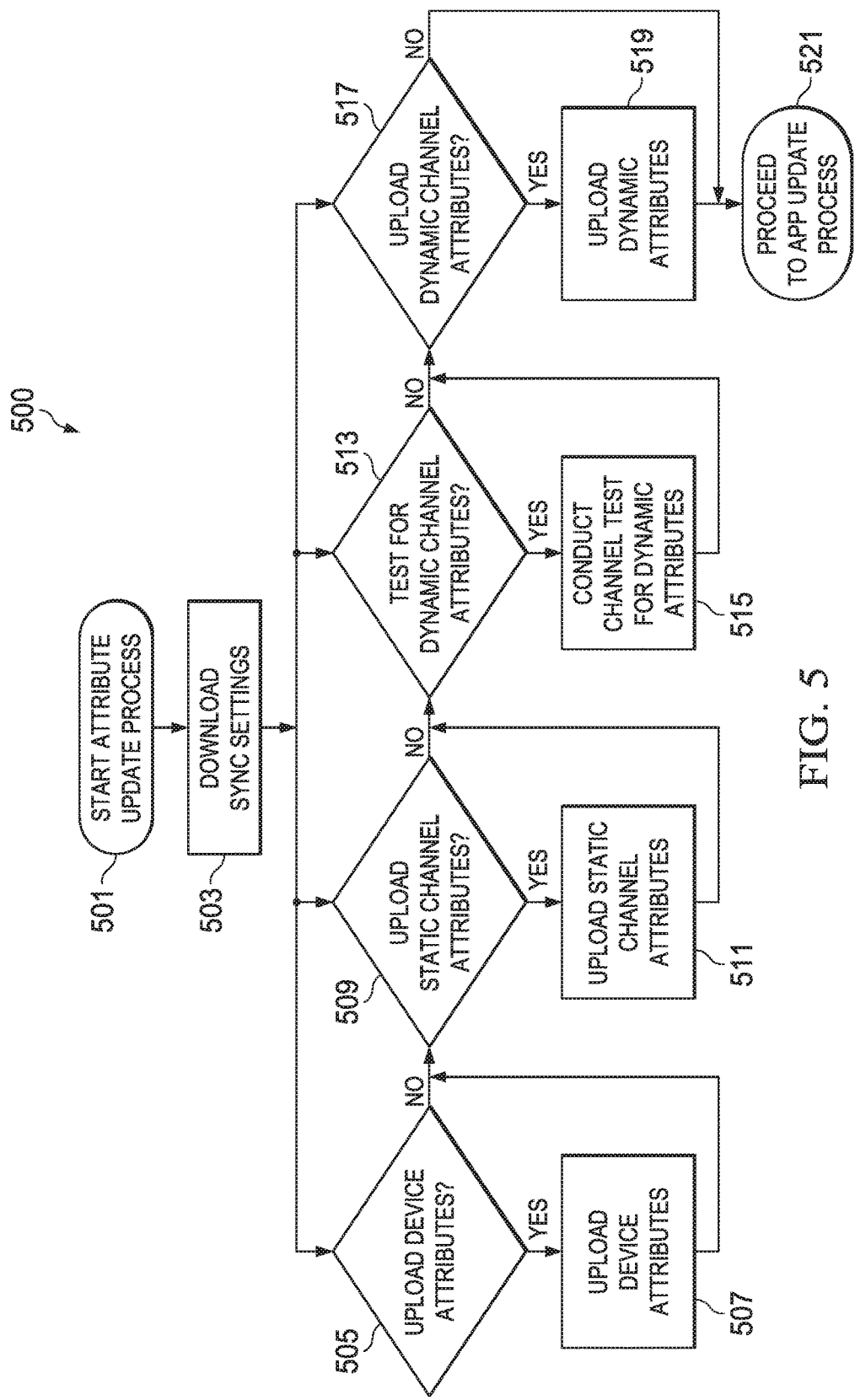
FIG. 5 depicts a flow diagram illustrating an example of an attribute update process according to some embodiments.

FIG. 5 depicts a flow diagram illustrating an example of attribute update process 500 performed by a control logic (e.g., MAP logic 244 shown in FIG. 2) operating on a smart device. In some embodiments, attribute update process 500 may be initiated (step 501) by the smart device (e.g., mobile device 240 of FIG. 2) or triggered by a server remotely (e.g., a server machine embodying mobile synchronization module 250 of MAP 220 shown in FIG. 2). For example, referring to FIG. 2, MAP logic 244 may be configured with an update schedule and may cause mobile application 242 to start an attribute update process (step 501) periodically (e.g., every week or every other week) or based on some triggering event (e.g., every time or every third time mobile application 242 is launched). As another example, the server may send a notification (perhaps due to a change made by an administrator) to MAP logic 244. In response, MAP logic 244 may direct or otherwise cause mobile application 242 to start an attribute update process (step 501).

Figure 9:
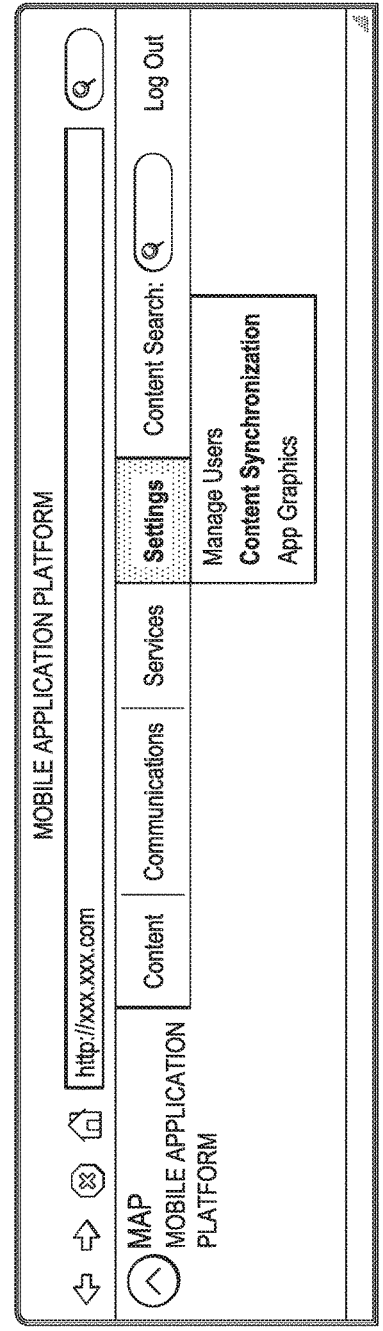
FIG. 9 depicts a diagrammatic representation of one example of a synchronization settings menu of an administrative user interface of a mobile application platform according to some embodiments.
Figure 10:
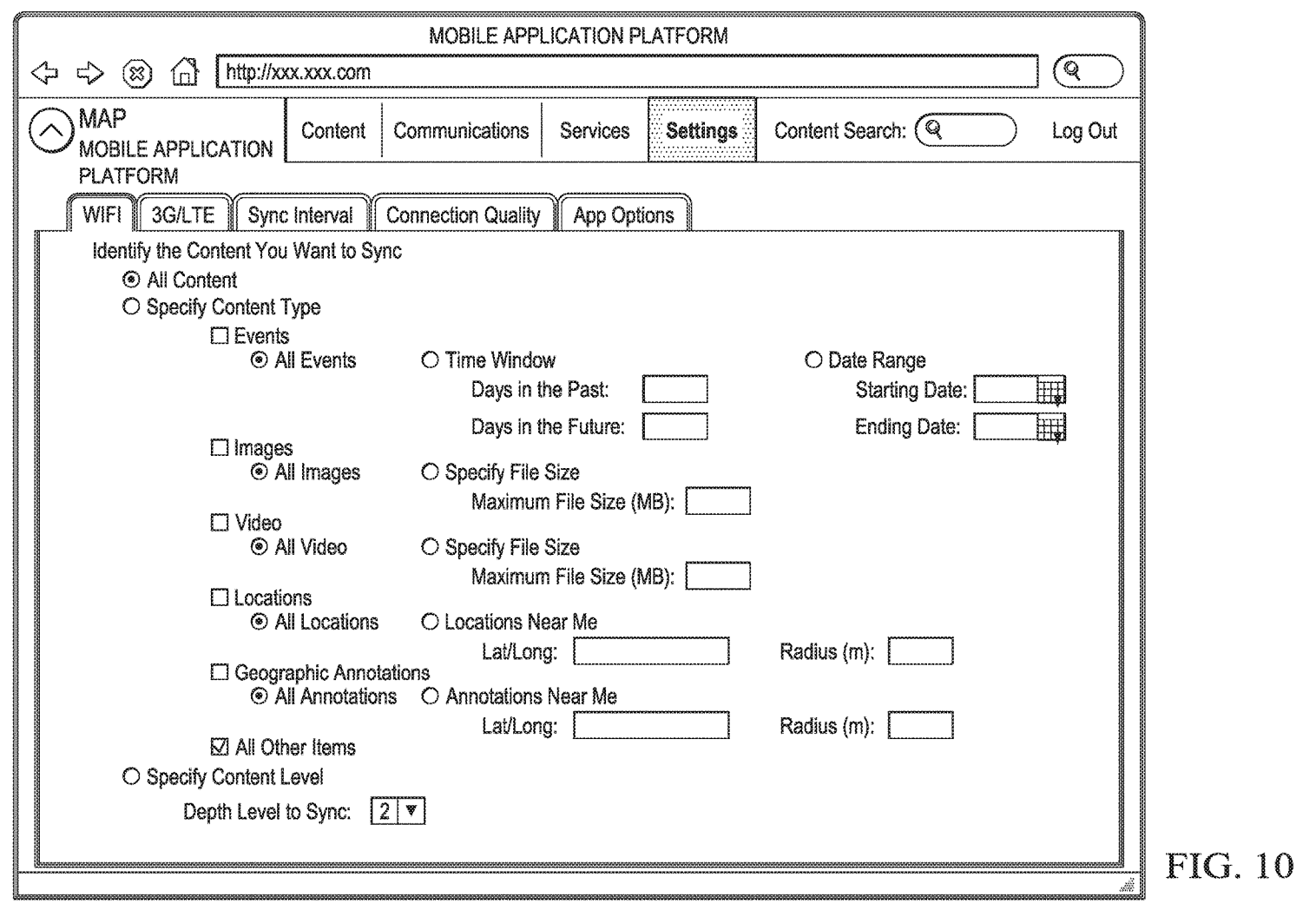

Referring to FIG. 5, at step 503, the smart device may download sync settings. In some embodiments, these sync settings may be preconfigured by an administrator (e.g., using client admin user interface 226 of MAP 220 shown in FIG. 2). One example of a synchronization settings menu of an administrative user interface of a mobile application platform is shown in FIG. 9. As further exemplified in FIGS. 10-15, various types of content synchronization settings may be specified by the administrator using the administrative user interface of FIG. 9 in accordance with content provider preferences.

Figure 11:
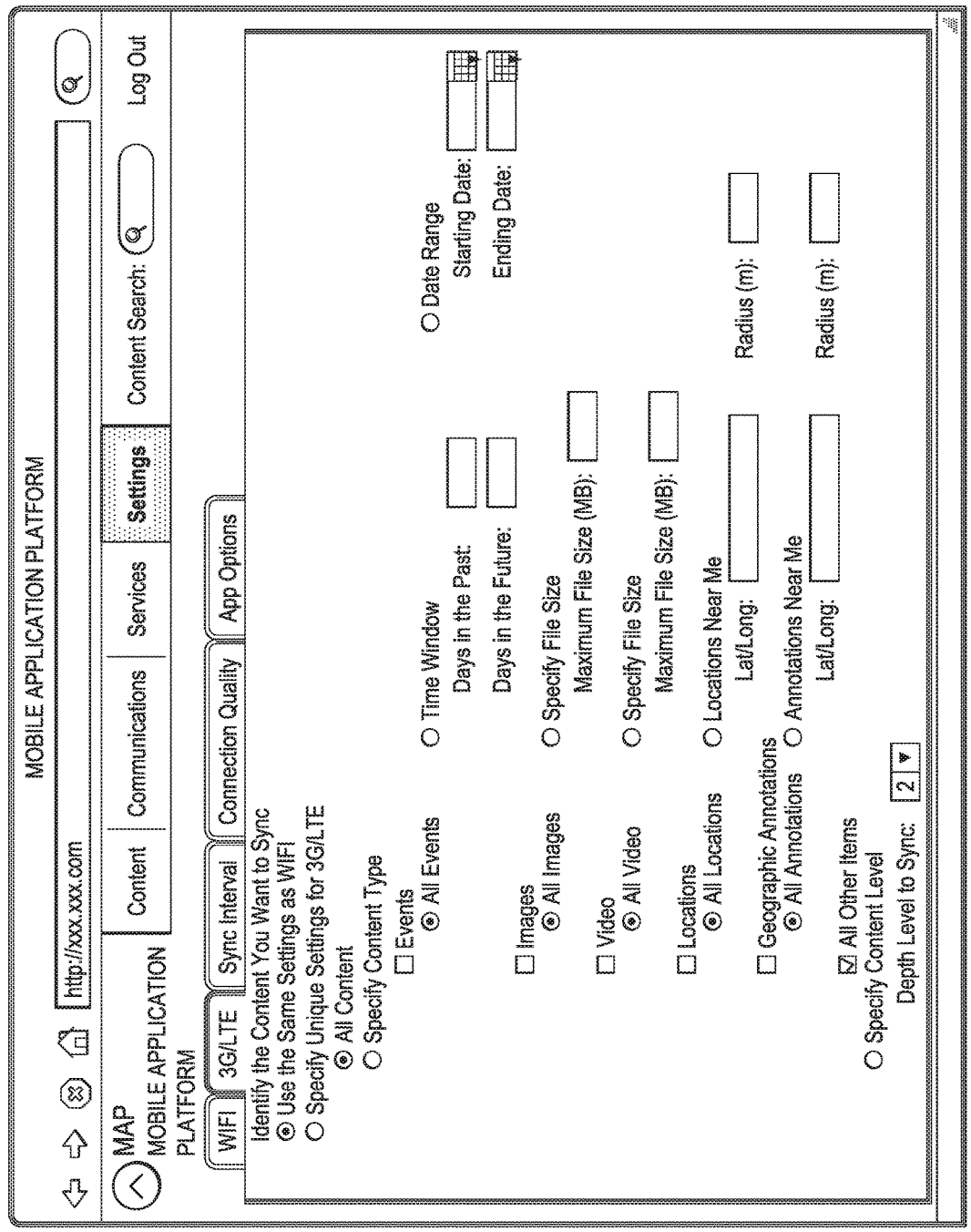
Figure 12:
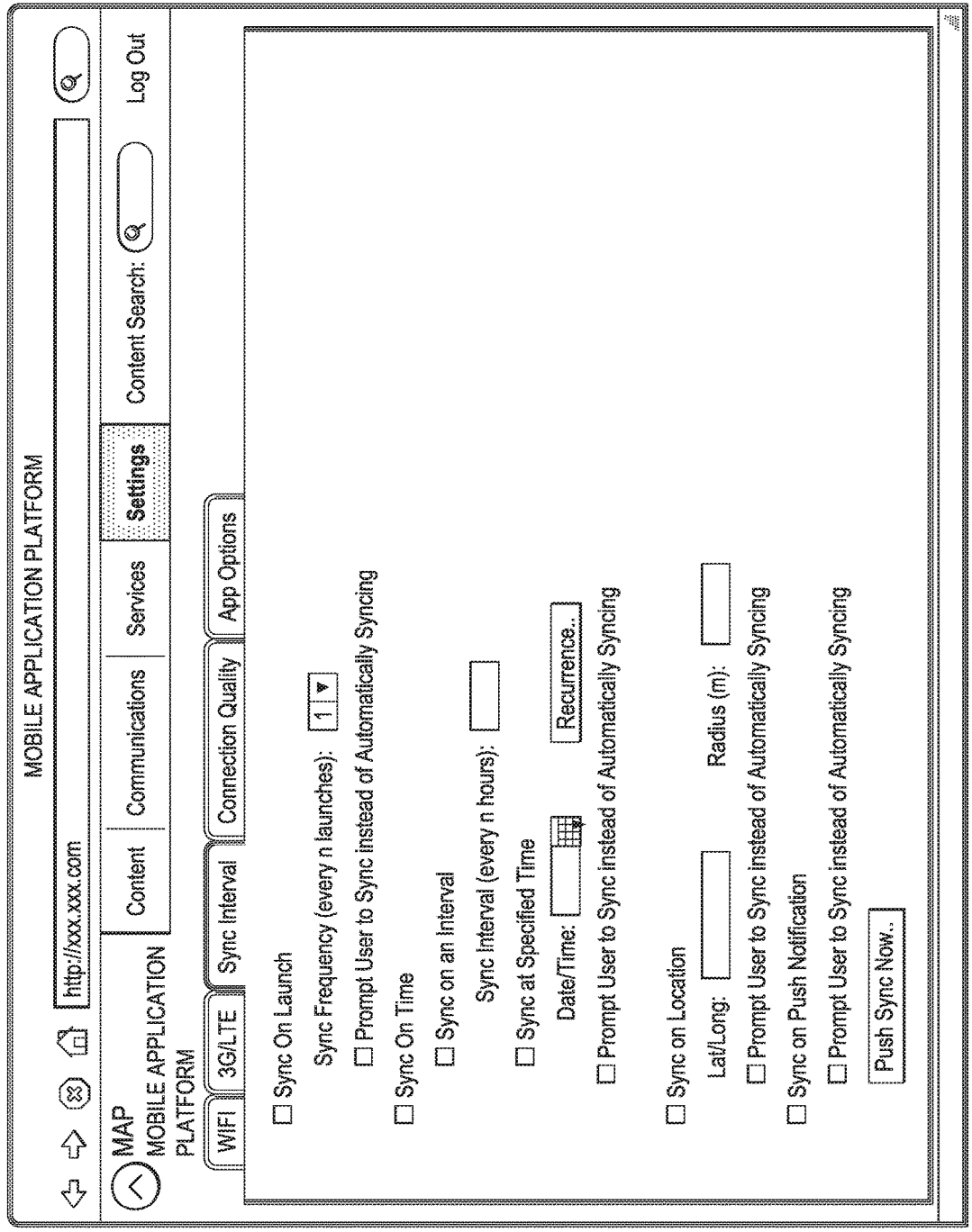
Figure 13:
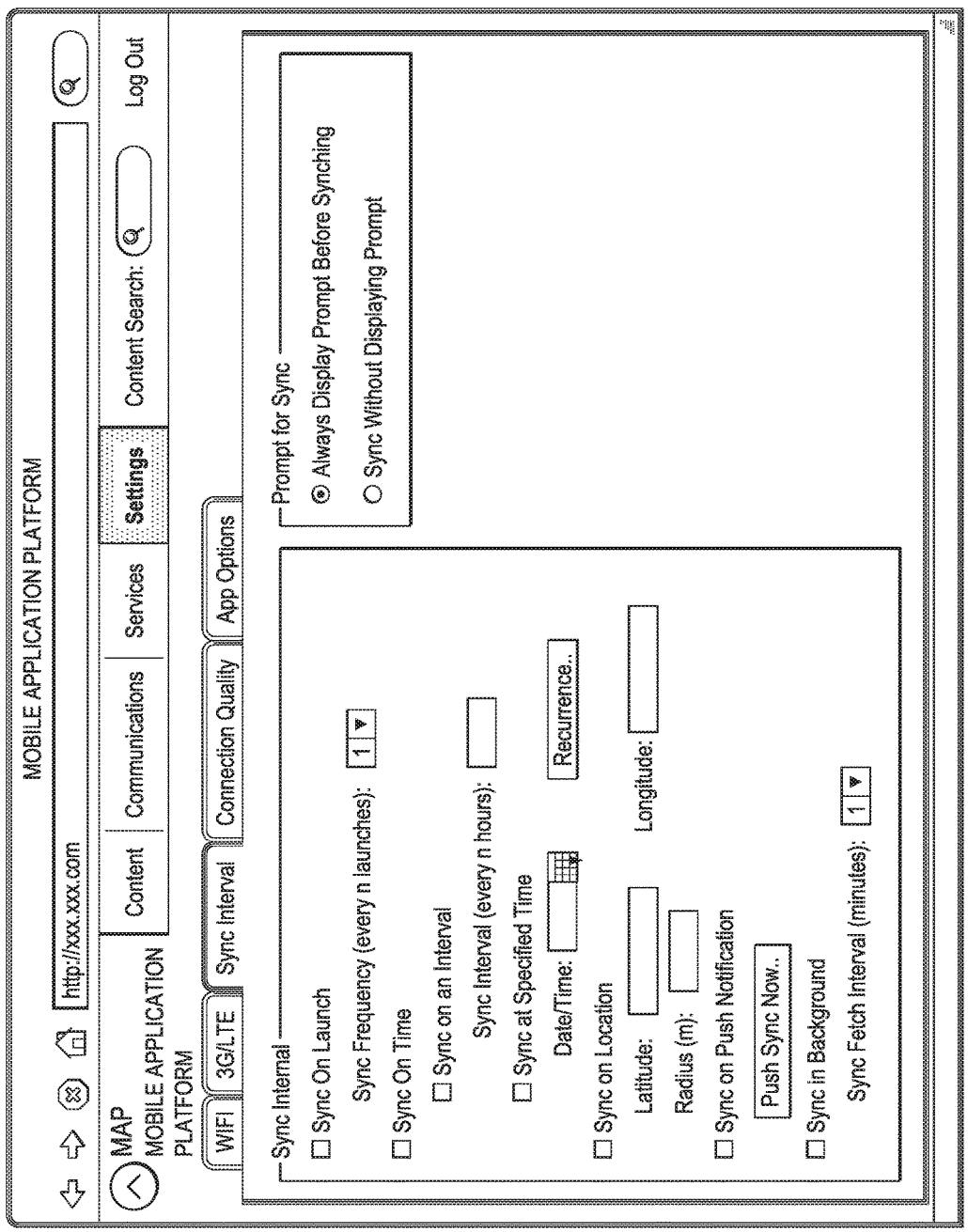
Figure 14:
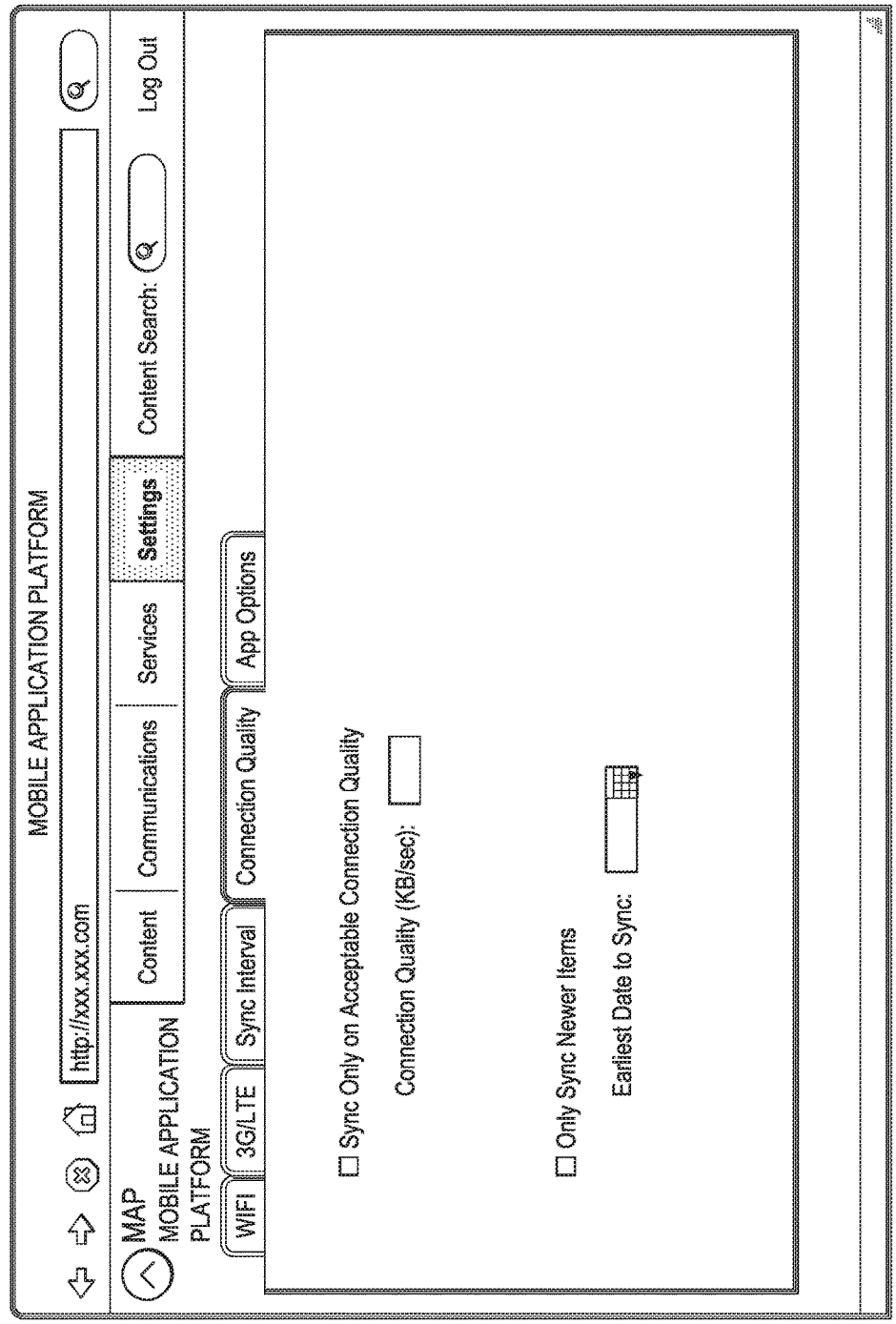
Figure 15:
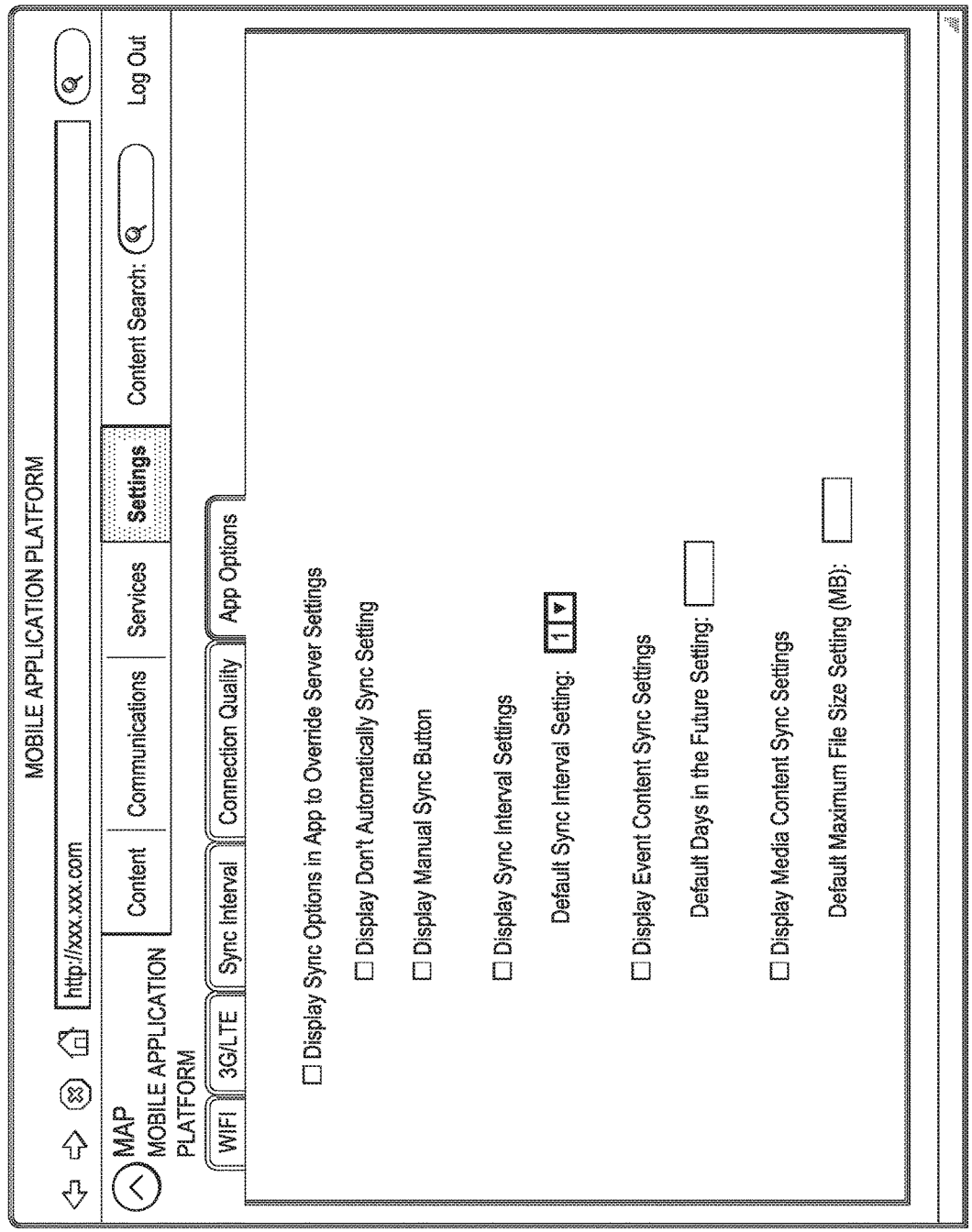

For example, the administrator may specify/set one or more content types, content level, geographic locations, timeframe, sizes, or all the content that can be synced via a WIFI connection (FIG. 10) and/or a cellular network connection (FIG. 11). The administrator may also specify/set a particular sync interval (e.g., on launch, on a schedule, on location, on push notification, or cause a real time sync, etc.) as illustrated in FIG. 12. Those skilled in the art will appreciate that a client admin user interface may differ from implementation to implementation. By way of example, FIG. 13 illustrates a sync interval configuration tab that provides an administrator with an option to specify whether to always display a prompt before synching as well as an option to perform a sync operation in the background. Accordingly, these examples are meant to be illustrative and non-limiting. As another example, FIG. 14 shows how the administrator may specify to sync only when a communication channel provides acceptable connection quality and how the administrator may specify what is considered as acceptable connection quality. Additionally or alternatively, the administrator may specify to sync only new items and may specifying what is considered to be "new" by setting a particular date. Furthermore, FIG. 15 shows how the administrator may expose certain configuration management options to a user of a mobile device, for instance, by indicating whether sync options are to be displayed to the user by the application running on the smart device such that certain mobile device user preferences may override preconfigured server settings.

Referring to FIG. 5, in some embodiments, all sync settings preconfigured by the administrator for the entire attribute update process 500 are downloaded at step 503. As illustrated in FIG. 5, in each phase of process 500, there are decision points 505, 509, 513, and 517. These decision points reflect choices based on content provider configured settings stored in the server. That is, through an administrative user interface, content provider preferences can be configured as settings at the server side and downloaded at step 503 so that they are available for future decision points.

As illustrated in FIG. 5, with sync settings downloaded from the server at step 503, decision points 505, 509, 513, and 517 may be performed (sequentially or in parallel). In some embodiments, not all types of information may be collected, depending upon the downloaded sync settings. For example, for performance reasons and as specified in the downloaded sync settings, device attributes may or may not be uploaded to the server. Device attributes refer to attributes of the mobile device and may include the make, model, OS version, etc., of the mobile device. If, according to the downloaded sync settings, device attributes are to be uploaded to the server, they are uploaded at step 507.

Either way, process 500 may proceed to decision point 509 concerning static channel attributes. These are attributes of a communication channel that are relatively static and may include WI Fl (if available), carrier, and signal strength of the communication channel. Again, such static channel attributes may or may not be uploaded. If, according to the downloaded sync settings, static channel attributes are to be uploaded to the server, they are uploaded at step 511.

Either way, process 500 may proceed to decision point 513 which determines whether a test is to be performed to collect dynamic channel attributes. Dynamic channel attributes refer to channel attributes that vary with the channel and may include measured channel bandwidth/speed and channel latency. If, according to the downloaded sync settings, a test is to be performed, the control logic running on the smart device may cause the smart device to conduct a channel test and collect the dynamic channel attributes at step 515. In one embodiment, the collected dynamic channel attributes may be optionally uploaded at step 519 directly after such a test is conducted (i.e., optionally going from step 515 to step 519).

In some embodiments, process 500 may proceed to decision point 517, at which point the control logic running on the smart device may determine, according to the downloaded sync settings, whether to upload dynamic channel attributes. If so, whatever dynamic channel attributes the smart device has (e.g., from step 515 or from when the communication channel is established) are uploaded to the server at step 519. Accordingly, at the conclusion of process 500 (step 521), the server may have collected device attributes, static channel attributes, and/or dynamic channel attributes from the smart device.

Based on the various attributes thus collected via attribute update process 500, the server implementing the mobile synchronization algorithm may make an assessment of the quality of the communication channel and determine, on-the-fly, particular communication settings for an optimal delivery of synchronization items to the particular smart device over the particular communication channel as dictated by various specific preconfigured administrative settings such as WIFI settings, carrier settings, sync interval settings, connection quality settings, app options, etc., as described above. For example, suppose a static channel attribute indicates a WIFI connection and a preconfigured administrative setting specifies that all content types can be synced via a WIFI connection (see, e.g., FIG. 10), the server implementing the mobile synchronization algorithm may determine a communication setting (e.g., sync all content types) specific to the WIFI connection. These communication settings are then used by subsequent processes.

Figure 6:
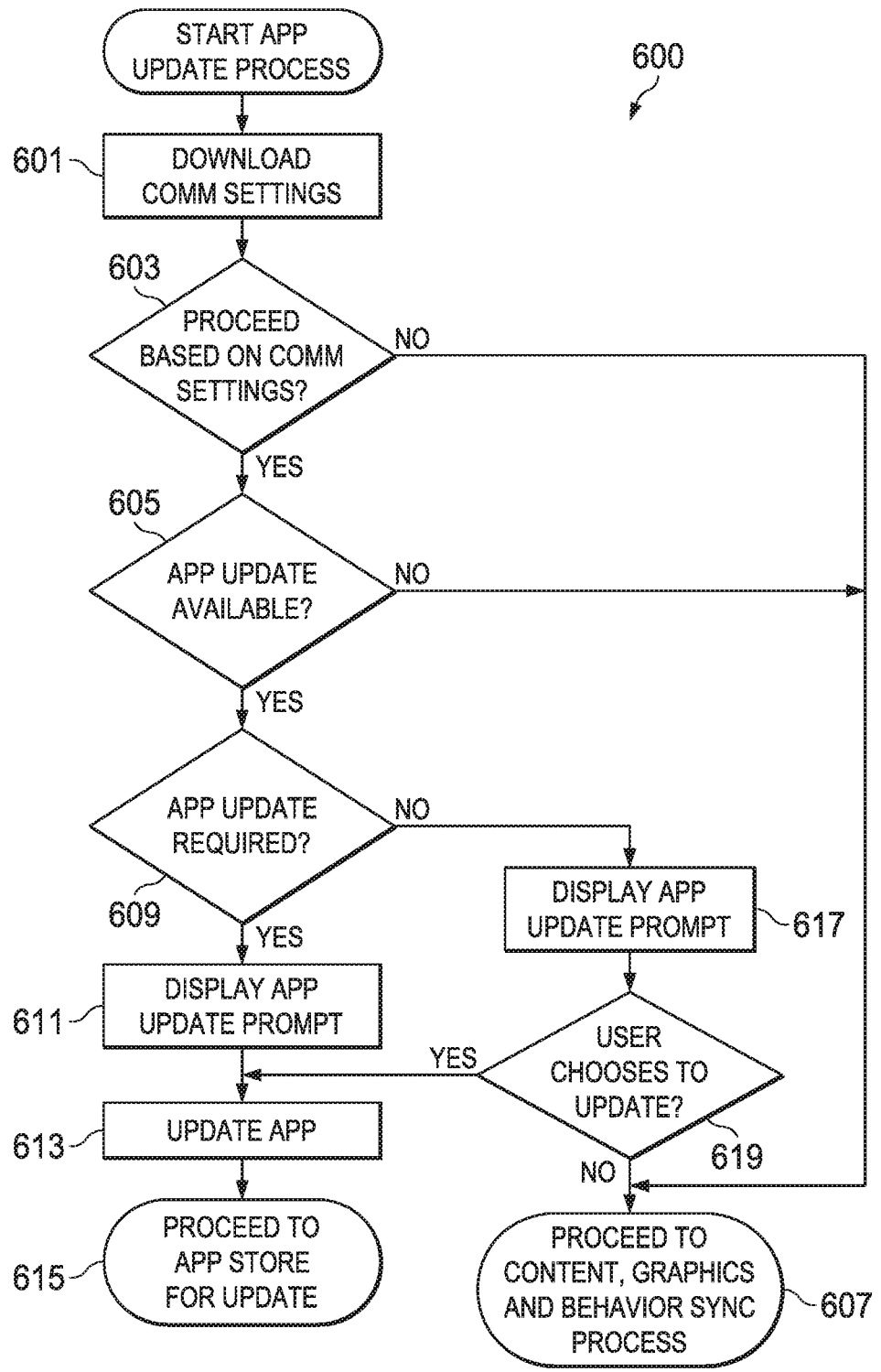
FIG. 6 depicts a flow diagram illustrating an example of an application update process according to some embodiments.

Referring to FIG. 6, in some embodiments, application update process 600 may first download communication settings from the server (step 601) and determine whether to proceed based on the downloaded communication settings (step 603). As described above, these downloaded communication settings may be determined at the server side based on an earlier attributes update process performed at the smart device in view of preconfigured content provider preferences and may vary based on the particular communication system elements including the content source, the communication channel, and the content sink involved.

For example, although the communication settings are downloaded at step 601, it may include a communication setting (an instruction to the smart device) not to proceed based on the downloaded communication settings. If so, application update process 600 may directly proceed to the next process (e.g., content, graphics and behavior synchronization process 700 shown in FIG. 7) at step 607.

However, if a communication setting indicates to the control logic running on the smart device that application update process 600 is to proceed based on the rest of the downloaded communication settings, application update process 600 may proceed to decision point 605 and check the downloaded communication settings to determine whether an application update is available. If not, application update process 600 may proceed to the next process (step 607).

If an application update is available, application update process 600 may proceed to decision point 609 and check the downloaded communication settings to determine whether the application update is required. If required, the control logic running on the smart device may cause the mobile application to display an update screen on the smart device, notifying the user that an update to the mobile application is required (step 611), and proceed to update the application (step 613) by, for instance, directing the smart device to access an app store for the required update (step 615).

If the application update is not required, the control logic running on the smart device may cause the mobile application to display an update screen on the smart device, indicating that an update to the mobile application is available through an app store (step 617). The update screen may include a selection allowing the user to decide whether to perform the update (step 619). If the user chooses not to update the application at that point in time, application update process 600 may proceed to the next process (step 607). If the user chooses to update the application, application update process 600 may proceed to update the application (step 613) by, for instance, directing the smart device to access an app store for the update (step 615).

Figure 7:
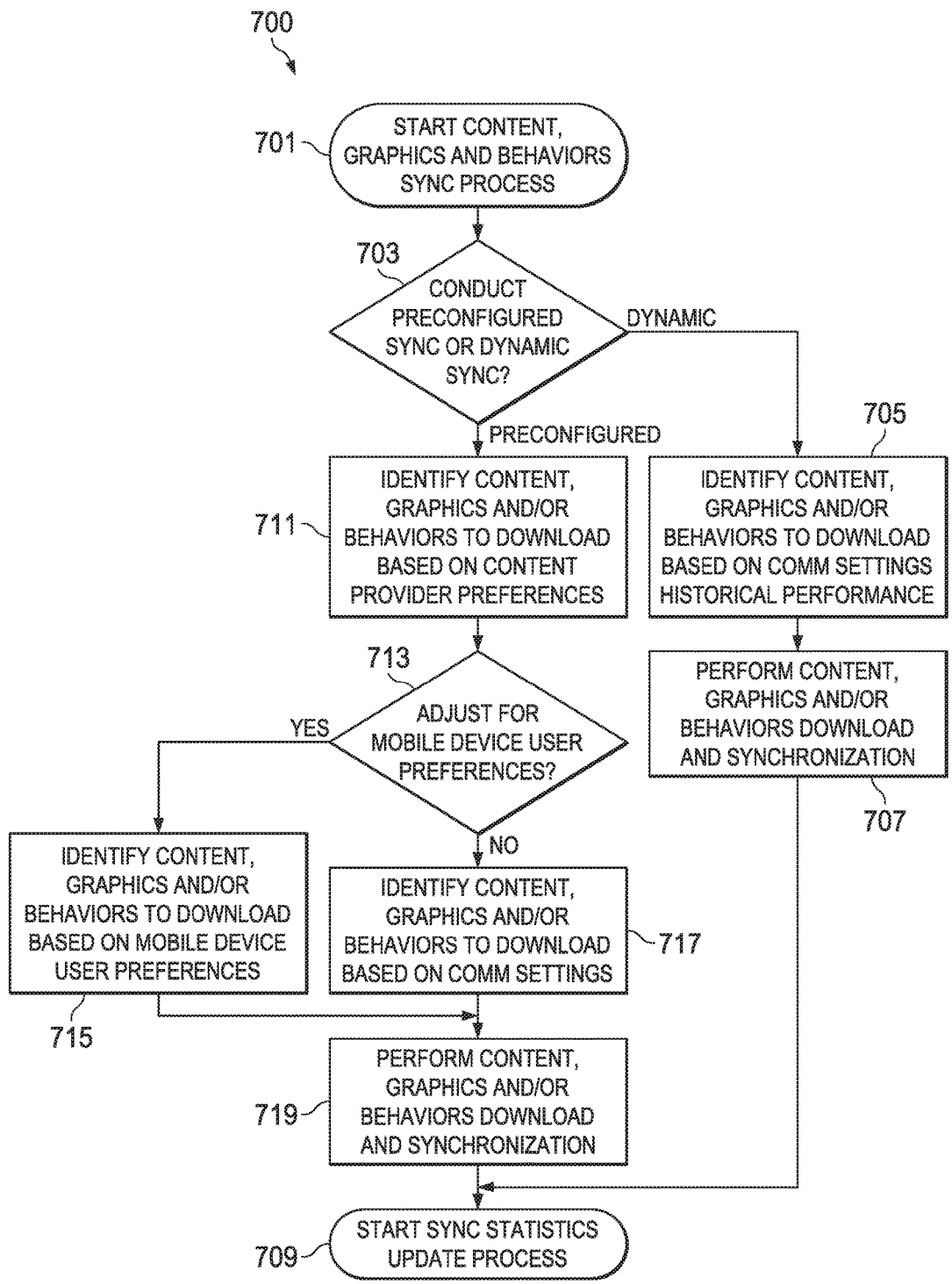
FIG. 7 depicts a flow diagram illustrating an example of a behavior synchronization process according to some embodiments.

According to this disclosure, an application update performed by an app store is distinguished from application enhancements/updates performed by content, graphics and behavior synchronization process 700 shown in FIG. 7. The former necessarily dictates a change in the version number of the application, as enforced by the third-party app store, while the latter does not change the version number of the application, even though the application enhancements/updates performed by graphics and behavior synchronization process 700 may cause the application to drastically change in appearance and/or behaviors.

FIG. 7 depicts a flow diagram illustrating an example of content, graphics and behavior synchronization process 700 which, according to some embodiments, may start at step 701 following various decision points of application update process 600, as described above. At step 703, process 700 may determine whether to conduct a preconfigured sync process or a dynamic sync process based on a preconfigured setting stored at the server side. For example, during configuration, an administrator may elect to manually configure settings for this process or may elect to rely on system determined settings. If the administrator indicates that they wish to configure the sync process themselves, they are guided through a rich configuration process to specify various sync scenarios which they consider to be optimum and all their preferences are stored (e.g., in a database at the server side). If the administrator indicates that they wish to rely on system determined settings, the system may operate to automatically and heuristically determine an optimum sync process. The stored preconfigured setting may therefore reflect a content provider's preference to a preconfigured sync process or a dynamic sync process.

In a preconfigured sync process (beginning at step 711), synchronization may be completely determined by content provider preferences or possibly adjusted per mobile device user preferences, at step 713, if user configuration is allowed/exposed, as described above. Accordingly, content, graphics, and/or behaviors may be identified or otherwise determined based on mobile device user preferences (step 715) or communication settings per content provider preferences (step 717).

Figure 16:
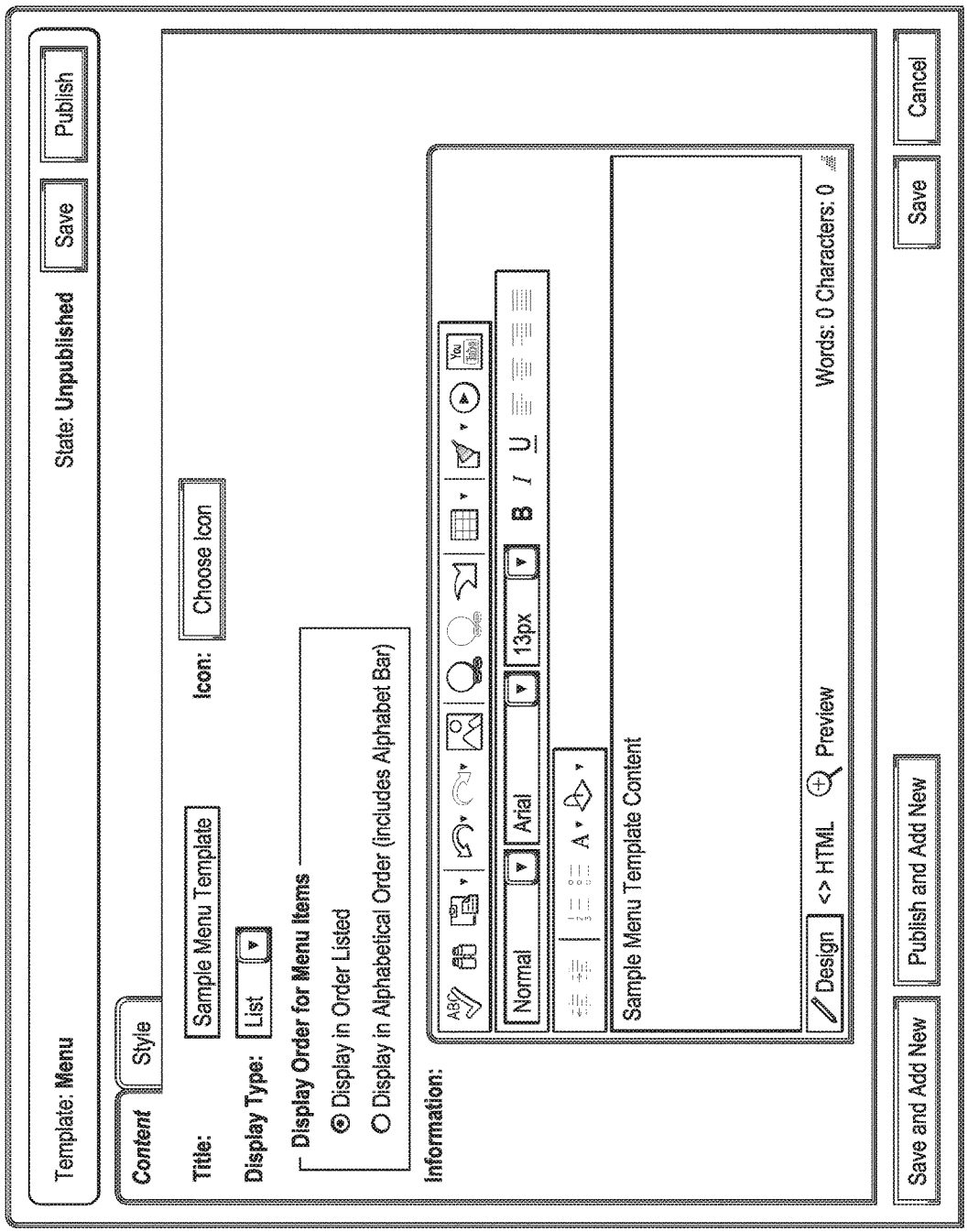
FIG. 16 depicts a diagrammatic representation of an example of a synchronization item shown in an administrative user interface according to some embodiments.

In some embodiments, content, graphics, and behaviors of a mobile application may be defined by object types. For example, content may refer to a particular type of objects that may include consumable information such as news, reports, etc.; graphics may refer a particular type of objects that include graphical elements of the mobile application such as a background image, an icon, etc.; and behaviors may refer to a particular type of objects that may include templates, each defining a particular behavior. As a specific example, a first template may specify that the mobile application is to provide a list of menu items and allow a user to pull down the list to view the menu items, while a second template may specify that the mobile application is to provide icons and allow a user to swipe the icons. In this example, the list of menu items and the icons may represent the same set of functions. However, depending upon which template is used, the mobile application may behave entirely differently in providing the same function. As a non-limiting example, FIG. 16 depicts a diagrammatic representation of a menu template shown in an administrative user interface according to some embodiments. As those skilled in the art will appreciate, this example menu template is representative of synchronization items relating to content, graphics, and/or behaviors of a mobile application.

Once one or more synchronization items relating to content, graphics, and/or behaviors are identified or otherwise determined (at step 715 or step 717), process 700 may proceed to download and/or sync the synchronization item(s) (step 719). This step may be performed in various ways, depending upon the type of a synchronization item. For example, an image residing on the smart device may be modified at the server side. In this case, a sync process can be performed to synchronize the image such that the image residing on the smart device is up-to-date with the version that was modified at the server side. As another example, a new menu item may be added to the mobile application. In this case, a download process can be performed to add the menu item to the mobile application. As yet another example, the server may add or modify a behavior template and a template table may be updated accordingly. Since the mobile application has already been configured to use behavior templates, changing the behavior of the mobile application may involve, minimally, changing or adding a behavior template. Various synchronization techniques may be utilized in so doing. For example, the control logic running on the smart device may check a local template table and communicate the last entry (e.g., entry number 901) to the server. In response, the server may check the central template table and communicate its last entry (e.g., entry number 902) to the control logic which, in turn, determines that it does not have the same last entry and, therefore, requests the server to provide the new entry. Responsive to the request, the server may provide the new entry and the control logic running on the smart device may download the new entry (e.g., entry number 902) and operate to update the local template table accordingly and thus completing process 700 (step 709).

In a dynamic sync process (beginning at step 705), synchronization may be determined heuristically. In some embodiments, this may include accessing, by a server implementing process 700, historical data comparable to the particular communication system elements (e.g., based on the attributes collected via attribute update process 500) and examining historical performance of past communication settings relative to the current communication settings. In some embodiments, the results of all past synchronizations are tracked by the server at the server side (e.g., via statistic synchronization process 800). Based on the performance of past synchronizations for the specific location, channel, device attributes, etc., the server can determine an optimal synchronization process. In some embodiments, this may include comparing the geographic location of the smart device, the carrier network involved, and the particular time at which a sync operation is to be performed relative to past synchronizations similarly performed over time and corresponding performance data (e.g., statistics on speed, throughput, size, etc.) and selecting synchronization parameters that the server considers as the most optimal for the current communication settings. At step 707, process 700 may proceed to download and/or sync the synchronization item(s) in a manner similar to step 729 described above.

Figure 8:
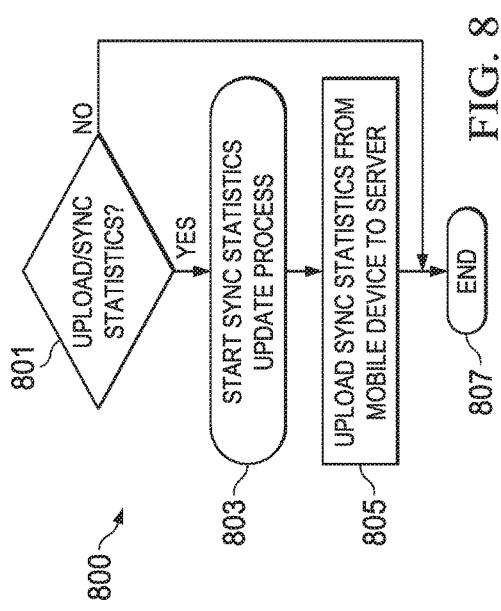
FIG. 8 depicts a flow diagram illustrating an example of a synchronization statistics update process according to some embodiments.

FIG. 8 depicts a flow diagram illustrating an example of synchronization statistics update process 800 according to some embodiments. In some embodiments, synchronization statistics update process 800 can be used to send the statistics for the synchronization to the server side (e.g., mobile synchronization module 250 of MAP 220 shown in FIG. 2) on completion (e.g., step 709 of FIG. 7) of a download and synchronization process. For example, upon completion of a download and synchronization process, control logic (e.g., MAP logic 244 shown in FIG. 2) running on a smart device may operate to determine, based on a preconfigured setting, whether process 800 is to be performed (step 801). If not, process 800 ends (step 807). However, if the preconfigured setting indicates that process 800 is to be performed, the control logic may start a sync statistics update process (step 803) and upload statistics for the synchronization to the server side (e.g., a server machine implementing mobile synchronization module 250 shown in FIG. 2). This data is retained (e.g., stored in a synchronization database of MAP 220) and can be used in a dynamic sync process such as one described above with reference to FIG. 7.

Figure 18:
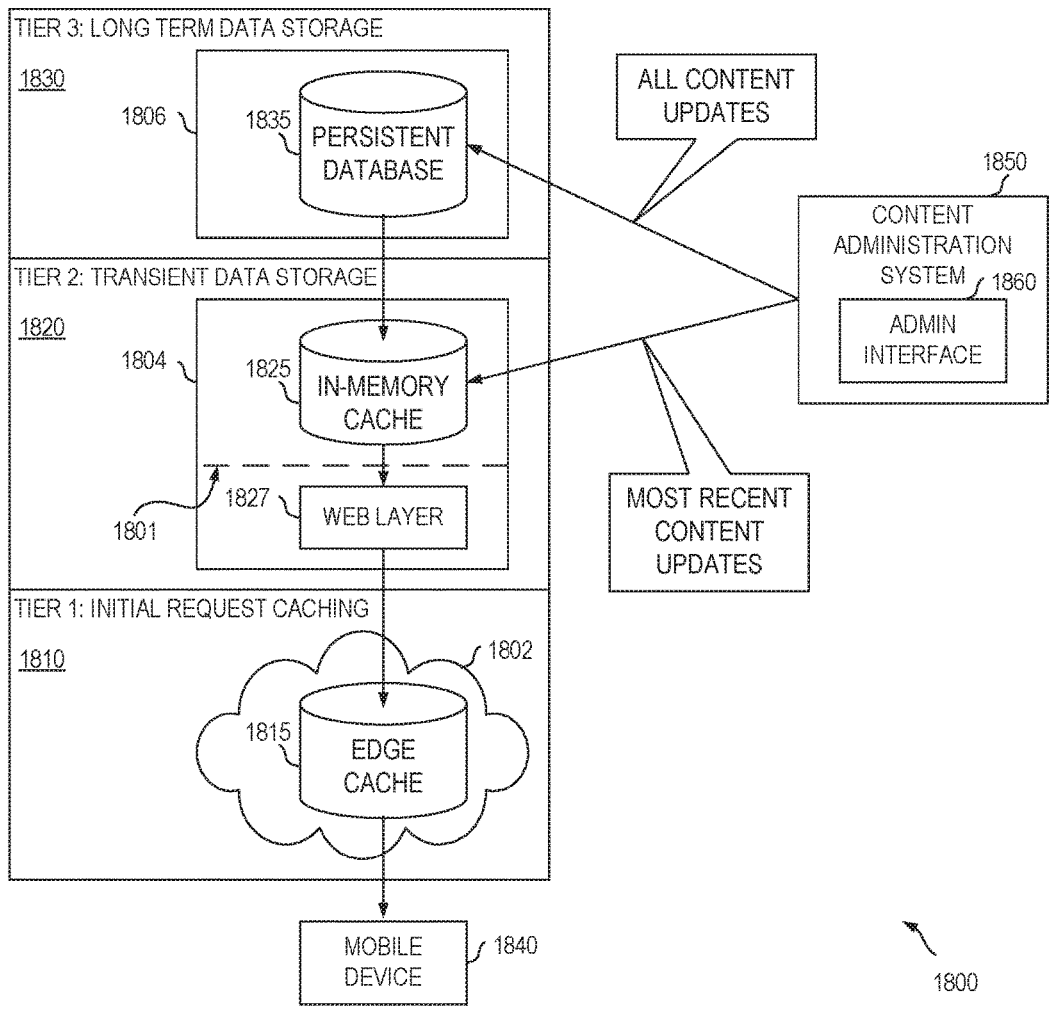
FIG. 18 depicts a diagrammatic representation of one example embodiment of a tiered storage solution.

In some embodiments, synchronization performance can be further optimized while minimizing costs by using a tiered storage solution in which data to be synchronized is stored in a cascading array of differentiated storage technologies in order to optimize synchronization performance while minimizing the cost of implementation. FIG. 18 depicts a diagrammatic representation of one such example embodiment of a tiered storage solution.

Skilled artisans appreciate that there are various types of data storage technologies. Further, skilled artisans appreciate that, in addition to the types of data storage technologies used, the physical location of the data storage device(s) storing the requested data in relation to the physical location of a requesting device is of significant importance. The smaller the physical distance between the physical locations of the requested data and of the requesting device, the less time it will take to service a request for content and perform the necessary synchronization. For example, suppose a client device located in Los Angeles sends a request for content that is physically stored in New York (e.g., at an "origin server"). Due to the vast physical distance between Los Angeles and New York, there may be latency (e.g., typically in the range of 75-140 milliseconds) for the origin server to respond to the request. Depending upon the network connection type, the latency can be significantly higher, especially for mobile users accessing a site over a slower network such as the 3G network. Further, if the requested content contains hundreds of objects, then the browser running on the client device would need to make corresponding hundreds of individual requests to the origin server to retrieve those objects. If the content can be physically stored in Los Angeles (e.g., at an "edge server"), the response time can be reduced to a mere few milliseconds. The improvement in response time can be significant.

Accordingly, some embodiments of a tiered storage solution may leverage a content delivery network as a first tier storage mechanism. A content delivery or distribution network (CDN) generally refers to a network of distributed proxy servers that deliver webpages and web content to users based on the geographic locations of the users, the source(s) of the webpages and web content, and the content delivery server. Generally, the content delivery server copies the pages of a website to a network of servers that are dispersed at geographically different locations, caching the contents of the page (e.g., in "edge caches"). When a website visitor's device requests a webpage that is part of a CDN, the CDN may redirect the request from the originating website's server to a server in the CDN that is closest to the website visitor's device and that server delivers the cached content. The CDN may also communicate with the originating website server to deliver any content that has not been previously cached. The goal of a CDN is to serve content to end-users with high availability and high performance.

However, a CDN alone may not be sufficient to truly optimize the performance for content synchronization systems and methods disclosed here. For example, CDNs do not facilitate server-side processing, so they do not improve content synchronization performance, before the content can be cached by any CDN server. Further, while caching non-sensitive content in a CDN (which is usually operated by a third party that is separate and independent from the operator of the origin sever) may represent a low risk, there may be security issues in allowing a CDN to cache sensitive content.

To this end, as illustrated in the example of FIG. 18, tiered storage solution 1800 may comprise first tier storage mechanism 1810 ("Tier 1"), second tier storage mechanism 1820 ("Tier 2"), and third tier storage mechanism 1830 ("Tier 3"). First tier storage mechanism 1810 may comprise CDN 1802 with edge cache 1815 storing initial requests and/or parameters thereof. Second tier storage mechanism 1820 and third tier storage mechanism 1830 may be communicatively connected to content administration system 1850. Content administration system 1850 may be owned and operated by the operator of system 200 described above. First tier storage mechanism 1810 may be owned and operated by a third party independently of content administration system 1850. However, the behaviors and operations of first tier storage mechanism 1810 can be expected as follows.

Edge cache 1815 at Tier 1 may store cached web responses. These may include infrequently changed content that can be stored for long periods of time (e.g., 20 hours) on CDN 1802, providing near instantaneous responses (e.g., in mere milliseconds) to mobile clients and avoiding any additional web server or database storage resource needs, and consequently reducing runtime costs. For example, responsive to a request for content, a portion of the requested content (e.g., a page, a number of rows or database records, a 5-second data stream, etc.) may be stored and cached along with the request. The cached data can be used to serve multiple requests for the same content. The response time for Tier 1 can be significantly less (e.g., 100 times or 1000 times less) than that of Tier 2. Although a single edge cache 1815 and a single CDN 1802 are shown at Tier 1, skilled artisans appreciate that there can be multiple edge caches and/or multiple CDNs at Tier 1. Further, skilled artisans appreciate that edge cache 1815 can be implemented as a hardware component or a software component of a CDN server in CDN 1802.

Second tier storage mechanism 1820 may comprise memory-optimized storage system 1804 having in-memory database or cache 1825. In-memory cache 1825 at Tier 2 can be particularly configured for storing transient data (e.g., up to an hour) that is more frequently accessed by synchronization clients requesting the latest changes. In this example, memory-optimized storage system is designed to increase server-side processing performance by holding frequently-requested data in memory, reducing the need for database queries to get that data (e.g., from database 1835 at Tier 3). Accordingly, this data is the most recently updated, and therefore most frequently accessed by synchronization clients requesting the latest changes.

Following the above example request for content, while a portion of the requested content can be cached at Tier 1, another portion of the requested content may still be in the process of being written to in-memory cache 1825. For example, suppose the system is writing 10 pages of content to in-memory cache 1825 and writing of page 1 has been completed (or, 10 rows of 100 rows have been completed, or any portion of the entire set of data has been completed), the completed portion (which, in this example, in one page) can be stored at Tier 1. While page 2 is being written, a portion of page 2 can also be cached at Tier 1, with the rest of the "in-process" portion of page 2 is being written to in-memory cache 1825. CDN 1802 at Tier 1 then pings in-memory cache 1825 at Tier 2 to get more data.

There can be many types of "in-process" content at Tier 2, for instance, current work in progress, latest update, etc. Like Tier 1, update to in-memory cache 1825 at Tier 2 may be triggered by mobile clients (e.g., due to user interactions with system 200 described above). As an example, in response to a request for content from a client device (e.g., mobile device 1840), a CDN server at Tier 1 may operate to check edge cache 1815 and determine whether the requested content already resides on edge cache 1815. If so, the cached content may be provided to the requesting client device. If not, the CDN server may contact the origin server which, in this case, may be a web server residing at web layer 1827 at Tier 2. The web server may operate to check in-memory cache 1825 (which, in one embodiment, may entail communicating with in-memory cache 1825 via firewall 1801 of memory-optimized storage system 1804) and determine whether the requested content resides on in-memory cache 1825. If so, the cached content may be provided from Tier 2 to Tier 1. If not, memory-optimized storage system 1804 may operate to communicate with database management system 1806 at Tier 3 to retrieve the requested content from persistent database 1835. Content retrieved from persistent database 1835 can be used by memory-optimized storage system 1804 to refresh/update in-memory cache 1825 at Tier 2. Likewise, content retrieved from Tier 2 can be used by the CDN server to refresh/update edge cache 1815 at Tier 1.

Additionally, in-memory cache 1825 at Tier 2 can also be updated by content administration system 1850. As illustrated in FIG. 18, data held in in-memory cache 1825 can be refreshed/updated by content administration system 1850 at the time that content changes are entered into the system. This process can be controlled or otherwise configured by an authorized user of content administration system 1850 via administrative user interface 1860.

At Tier 2, some special data processing may be performed so as to transform data (e.g., database data pulled or otherwise retrieved from database 1835 at Tier 3) into cacheable data (e.g., a file with JavaScript Object Notation (JSON) content) before the data can be stored at Tier 2 and/or communicated to Tier 1. One reason is that data formatted for persistent storage (e.g., in persistent database 1835 at Tier 3) may not be suitable and/or optimized for caching. In some cases, data communicated from Tier 2 to Tier 1 may include correction(s) and/or change(s) to data stored in edge cache 1815 (e.g., to reflect the newest version of the previously cached page 1, in the example above), in addition to newly (and dynamically) generated, cacheable data. Other types of cacheable formats may also be used.

Tier 2 can be implemented in many ways. For example, web layer 1827 can be embodied on a web server on the premises of the operator of system 200 in the same enterprise computing environment or on a host server operating in a cloud computing environment. Furthermore, although a single memory-optimized storage system 1804 is shown in FIG. 18, skilled artisans appreciate that Tier 2 may implement a plurality of memory-optimized storage systems. As a non-limiting example, an open source distributed memory caching system "Memcached" may be used to implement memory-optimized storage system 1804. Memcached is known to those skilled in the art and thus is not further described herein.

In some embodiments, database management system 1806 may be implemented on at least one database server operating on the premises of the operator of system 200 in the same enterprise computing environment or on a host server operating in a secure cloud computing environment. Communications among memory-optimized storage system(s) 1804 operating at Tier 2, database management system(s) 1806 at Tier 3, and content administration system 1850 may implement various network security measures to prevent unauthorized accesses as those skilled in the art can appreciate.

Persistent data store or database 1835 at Tier 3 can be particularly configured for long term storage and access. In some embodiments, database management system 1806 at Tier 3 may implement a Relational Database Management System (RDBMS) or NoSQL data store. Tier 3 can be the most costly of the three tiers since computational and storage resources maybe heavily utilized. Persistent database 1835 at Tier 3 can be updated by content administration system 1850 at the time that content changes are entered into the system.

In operation, a request from a synchronization client may first be directed to the first tier storage mechanism. If the request cannot be fulfilled by the first tier storage mechanism, it is directed to the second tier storage mechanism. If the data is not available at the second tier storage mechanism, then the third tier storage mechanism is queried. The first and second tier storage mechanisms can operate to update their stored data accordingly such that, so long as their caches have not expired, they can service subsequent requests that may have the same request parameters. In some cases, the requested content may reside at different tiers. Thus, responding to a request for content may involve all three tiers. The tiered storage solution described above can advantageously leverage the performance benefits provided by a unique combination of different storage technologies to further optimize synchronization performance of the systems and methods disclosed herein while minimizing costs of response time, data storage, and resource utilization.

Figure 17:
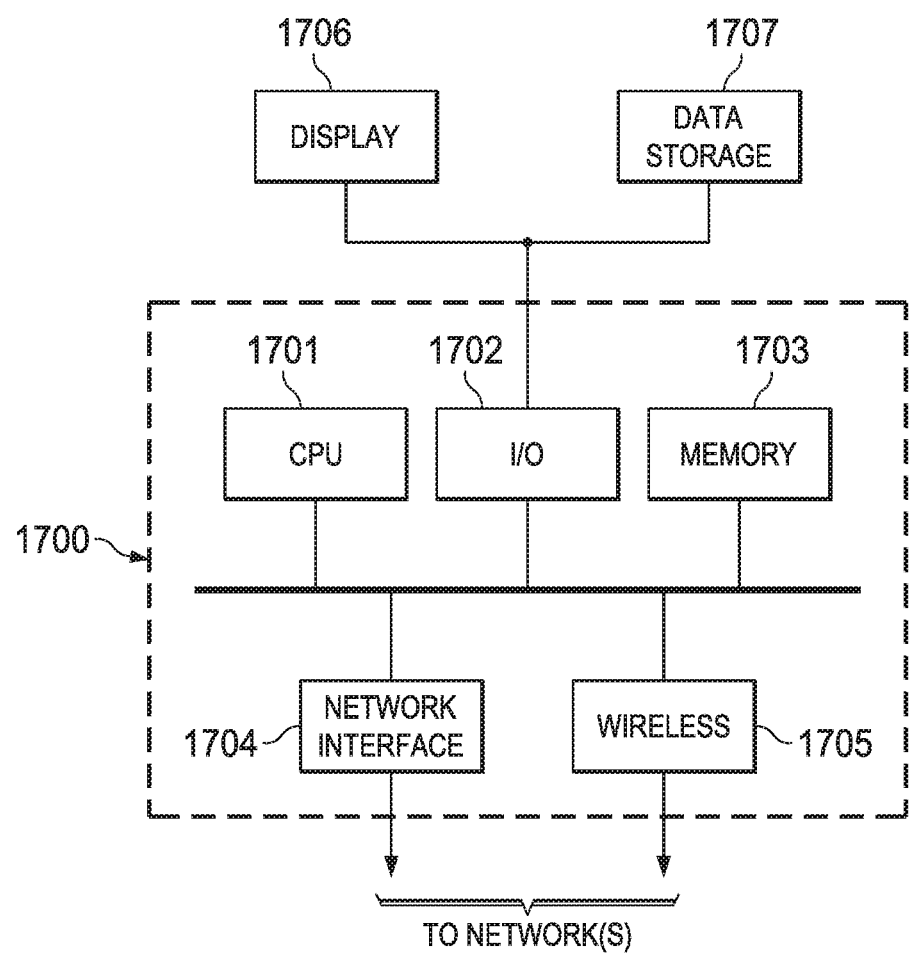
FIG. 17 depicts a diagrammatic representation of one example embodiment of a data processing system.

FIG. 17 depicts a diagrammatic representation of one example embodiment of a data processing system that can be used to implement embodiments disclosed herein. As shown in FIG. 17, data processing system 1700 may include one or more central processing units (CPU) or processors 1701 coupled to one or more user input/output (I/O) devices 1702 and memory devices 1703. Examples of I/O devices 1702 may include, but are not limited to, keyboards, displays, monitors, touch screens, printers, electronic pointing devices such as mice, trackballs, styluses, touch pads, or the like. Examples of memory devices 1703 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 1700 can be coupled to display 1706, information storage device 1707 and various peripheral devices (not shown), such as printers, plotters, speakers, etc. through I/O devices 1702. Data processing system 1700 may also be coupled to external computers or other devices through network interface 1704, wireless transceiver 1705, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Embodiments disclosed herein can provide many advantages. For example, content providers can configure and fine-tune an optimized and ideal content, graphics, and behaviors synchronization experience with mobile device users. After synchronization, this content, graphics, and behaviors can be available to mobile device users even if no network connection is available. Accordingly, some embodiments may allow an authorized user (e.g., for a content provider or application developer) to update the content and the application may look the same. Additionally, some embodiments may allow a user to change the appearance and/or behavior(s) of the application. For example, an application may have a navigational structure of four menu items arranged in a list view on the top level. An authorized user can cause an application update to change the appearance and/or the functionality of the application such that the navigational structure now has eight menu items arranged in a grid view, each menu item configured to perform a particular function. An authorized user can also cause an application update to be performed through a third-party app store, whether the application is required or optional. In some embodiments, a mobile synchronization module at the server side and control logic at the client slide may work in concert to implement an optimum algorithmic download and synchronization process in which both types of application updates may be performed.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, a mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments of the invention described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise. The scope of the present disclosure should be determined by the following claims and their legal equivalents.

What is claimed is:

1. A method for optimized content synchronization, comprising:

providing preconfigured synchronization settings to a mobile device, the providing performed by a server machine having at least one processor and non-transitory computer memory embodying a mobile synchronization algorithm, wherein an application running on the mobile device is operable to collect information on communication system elements including device attributes, static channel attributes, dynamic channel attributes, or a combination thereof, the application having a version number;

receiving, by the server machine from the mobile device to which the preconfigured synchronization settings are provided, the information on the communication system elements collected by the application running on the mobile device;

determining, by the server machine, communication settings based at least on the information on the communication system elements collected by the application running on the mobile device;

providing the communication settings to the mobile device, wherein the application running on the mobile device is operable to perform a synchronization process based at least in part on the communication settings determined by the server machine, wherein the synchronization process comprises the application running on the mobile device sending a request for a synchronization item; and responding to the request for a synchronization item from the application running on the mobile device, wherein the request for a synchronization item from the application running on the mobile device is processed by a plurality of server machines embodying a server-side tiered storage solution having a first tier storage mechanism, a second tier storage mechanism, and a third tier storage mechanism, wherein the first tier storage mechanism is operable to determine whether the synchronization item is stored in an edge cache of a content delivery network and to request the synchronization item from the second tier storage mechanism when the synchronization item is not found in the edge cache of the content delivery network, wherein the second tier storage mechanism is operable to determine whether the synchronization item is stored in an in-memory cache of a memory-optimized storage system and to request the synchronization item from the third tier storage mechanism when the synchronization item is not found in the in-memory cache of the memory-optimized storage system, wherein the third tier storage mechanism is operable to provide the synchronization item from a persistent database to the second tier storage mechanism when requested by the second tier storage mechanism, wherein the content delivery network provides the synchronization item to the mobile device, and wherein the synchronization process, which is performed by the application running on the mobile device, utilizes the synchronization item in updating at least one of content, graphics, or behavior of the application running on the mobile device without changing the version number of the application.

2. The method according to claim 1, wherein the synchronization process comprises the application running on the mobile device sending a plurality of requests for a plurality of synchronization items and wherein each request of the plurality of requests is processed by the plurality of server machines implementing the server-side tiered storage solution.

3. The method according to claim 1, wherein the edge cache of the first tier storage mechanism is particularly configured for caching previous responses to requests for synchronization items from the mobile device or synchronization client devices, wherein the in-memory cache of the second tier storage mechanism is particularly configured for storing transient data representing latest changes to the synchronization items, and wherein the persistent database of the third tier storage mechanism is particularly configured for persisting the synchronization items and any changes thereof provided by a content administration system.

4. The method according to claim 3, wherein the content administration system is configured for updating the in-memory cache of the second tier storage mechanism and the persistent database of the third tier storage mechanism.

5. The method according to claim 1, wherein the memory-optimized storage system of the second tier storage mechanism is configured for dynamically transforming database data retrieved from the persistent database of the third tier storage mechanism into cacheable data suitable for the in-memory cache of the second tier storage mechanism, the edge cache of the first tier storage mechanism, or both.

6. The method according to claim 5, wherein the cacheable data is in a JavaScript Object Notation (JSON) format.

7. The method according to claim 1, wherein the request for a synchronization item from the application running on the mobile device is received by a content delivery server operating in the content delivery network.

8. A system for optimized content synchronization, comprising:
a plurality of server machines embodying a server-side tiered storage solution having a first tier storage mechanism, a second tier storage mechanism, and a third tier storage mechanism, the plurality of server machines configured for processing requests for synchronization items from applications running on synchronization client devices, the plurality of server machines including a server machine having at least one processor and non-transitory computer memory embodying a mobile synchronization algorithm, wherein the server machine which embodies the mobile synchronization algorithm is operable to perform:
providing preconfigured synchronization settings to a mobile device, wherein an application running on the mobile device is operable to collect information on communication system elements including device attributes, static channel attributes, dynamic channel attributes, or a combination thereof, the application having a version number;
receiving, from the mobile device to which the preconfigured synchronization settings are provided, the information on the communication system elements collected by the application running on the mobile device;
determining communication settings based at least on the information on the communication system elements collected by the application running on the mobile device;
providing the communication settings to the mobile device, wherein the application running on the mobile device is operable to perform a synchronization process based at least in part on the communication settings determined by the server machine, wherein the synchronization process comprises the application running on the mobile device sending a request for a synchronization item; and
responding to the request for a synchronization item from the application running on the mobile device,
wherein the request for a synchronization item from the application running on the mobile device is processed by the plurality of server machines embodying the server-side tiered storage solution,
wherein the first tier storage mechanism of the server-side tiered storage solution is operable to determine whether the synchronization item is stored in an edge cache of a content delivery network and to request the synchronization item from the second tier storage mechanism when the synchronization item is not found in the edge cache of the content delivery network,
wherein the second tier storage mechanism of the server-side tiered storage solution is operable to determine whether the synchronization item is stored in an in-memory cache of a memory-optimized storage system and to request the synchronization item from the third tier storage mechanism when the synchronization item is not found in the in-memory cache of the memory-optimized storage system,
wherein the third tier storage mechanism of the server-side tiered storage solution is operable to provide the synchronization item from a persistent database to the second tier storage mechanism when requested by the second tier storage mechanism,
wherein the content delivery network provides the synchronization item to the mobile device, and
wherein the synchronization process, which is performed by the application running on the mobile device, utilizes the synchronization item in updating at least one of content, graphics, or behavior of the application running on the mobile device without changing the version number of the application.

9. The system of claim 8, wherein the synchronization process comprises the application running on the mobile device sending a plurality of requests for a plurality of synchronization items and wherein each request of the plurality of requests is processed by the plurality of server machines implementing the server-side tiered storage solution.

10. The system of claim 8, wherein the edge cache of the first tier storage mechanism is particularly configured for caching previous responses to requests for synchronization items from the mobile device or synchronization client devices, wherein the in-memory cache of the second tier storage mechanism is particularly configured for storing transient data representing latest changes to the synchronization items, and wherein the persistent database of the third tier storage mechanism is particularly configured for persisting the synchronization items and any changes thereof provided by a content administration system.

11. The system of claim 10, wherein the content administration system is configured for updating the in-memory cache of the second tier storage mechanism and the persistent database of the third tier storage mechanism.

12. The system of claim 8, wherein the memory-optimized storage system of the second tier storage mechanism is configured for dynamically transforming database data retrieved from the persistent database of the third tier storage mechanism into cacheable data suitable for the in-memory cache of the second tier storage mechanism, the edge cache of the first tier storage mechanism, or both.

13. The system of claim 12, wherein the cacheable data is in a JavaScript Object Notation (JSON) format.

14. The system of claim 8, wherein the request for a synchronization item from the application running on the mobile device is received by a content delivery server operating in the content delivery network.

15. A computer program product for optimized content synchronization, the computer program product comprising at least one non-transitory computer readable medium storing instructions translatable by at least one processor to perform:
  providing preconfigured synchronization settings to a mobile device, wherein an application running on the mobile device is operable to collect information on communication system elements including device attributes, static channel attributes, dynamic channel attributes, or a combination thereof, the application having a version number;
  receiving, from the mobile device to which the preconfigured synchronization settings are provided, the information on the communication system elements collected by the application running on the mobile device;
  determining communication settings based at least on the information on the communication system elements collected by the application running on the mobile device;
  providing the communication settings to the mobile device, wherein the application running on the mobile device is operable to perform a synchronization process based at least in part on the communication settings, wherein the synchronization process comprises the application running on the mobile device sending a request for a synchronization item; and
  responding to the request for a synchronization item from the application running on the mobile device,
    wherein the request for a synchronization item from the application running on the mobile device is processed by a plurality of server machines embodying a server-side tiered storage solution having a first tier storage mechanism, a second tier storage mechanism, and a third tier storage mechanism,
    wherein the first tier storage mechanism is operable to determine whether the synchronization item is stored in an edge cache of a content delivery network and to request the synchronization item from the second tier storage mechanism when the synchronization item is not found in the edge cache of the content delivery network,
    wherein the second tier storage mechanism is operable to determine whether the synchronization item is stored in an in-memory cache of a memory-optimized storage system and to request the synchronization item from the third tier storage mechanism when the synchronization item is not found in the in-memory cache of the memory-optimized storage system,
    wherein the third tier storage mechanism is operable to provide the synchronization item from a persistent database to the second tier storage mechanism when requested by the second tier storage mechanism,
    wherein the content delivery network provides the synchronization item to the mobile device, and
    wherein the synchronization process, which is performed by the application running on the mobile device, utilizes the synchronization item in updating at least one of content, graphics, or behavior of the application running on the mobile device without changing the version number of the application.

16. The computer program product of claim 15, wherein the synchronization process comprises the application running on the mobile device sending a plurality of requests for a plurality of synchronization items and wherein each request of the plurality of requests is processed by the plurality of server machines implementing the server-side tiered storage solution.

17. The computer program product of claim 15, wherein the edge cache of the first tier storage mechanism is particularly configured for caching previous responses to requests for synchronization items from the mobile device or synchronization client devices, wherein the in-memory cache of the second tier storage mechanism is particularly configured for storing transient data representing latest changes to the synchronization items, and wherein the persistent database of the third tier storage mechanism is particularly configured for persisting the synchronization items and any changes thereof provided by a content administration system.

18. The computer program product of claim 17, wherein the content administration system is configured for updating the in-memory cache of the second tier storage mechanism and the persistent database of the third tier storage mechanism.

19. The computer program product of claim 15, wherein the memory-optimized storage system of the second tier storage mechanism is configured for dynamically transforming database data retrieved from the persistent database of the third tier storage mechanism into cacheable data suitable for the in-memory cache of the second tier storage mechanism, the edge cache of the first tier storage mechanism, or both.

20. The computer program product of claim 15, wherein the request for a synchronization item from the application running on the mobile device is received by a content delivery server operating in the content delivery network.

* * * * *